United States Patent
Gorzkiewicz et al.

(10) Patent No.: US 12,136,950 B2
(45) Date of Patent: Nov. 5, 2024

(54) SYSTEMS AND METHODS FOR SIGNAL CONDITIONING AND NEGOTIATION

(71) Applicant: SEMTECH CORPORATION, Camarillo, CA (US)

(72) Inventors: Dariusz Michal Gorzkiewicz, Oakville (CA); Jacob Meachen, Gloucester (GB); Thomas Solomon, Ontario (CA)

(73) Assignee: SEMTECH CORPORATION, Camarillo, CA (US)

( * ) Notice: Subject to any disclaimer, the term of this patent is extended or adjusted under 35 U.S.C. 154(b) by 163 days.

(21) Appl. No.: 17/992,839

(22) Filed: Nov. 22, 2022

(65) Prior Publication Data

US 2024/0171280 A1 May 23, 2024

(51) Int. Cl.
  *H04B 10/27* (2013.01)
(52) U.S. Cl.
  CPC .................. *H04B 10/27* (2013.01)
(58) Field of Classification Search
  None
  See application file for complete search history.

(56) References Cited

U.S. PATENT DOCUMENTS

| | | | | |
|---|---|---|---|---|
| 2005/0238014 A1* | 10/2005 | Kang | ............ | H03G 3/3084 370/389 |
| 2008/0310861 A1* | 12/2008 | Wong | ............ | H04L 25/062 398/210 |
| 2010/0321072 A1* | 12/2010 | Bauwelinck | ............ | H04L 7/042 327/335 |
| 2011/0026921 A1* | 2/2011 | Ossieur | ............ | H04B 10/272 398/58 |
| 2018/0034432 A1* | 2/2018 | Shringarpure | ..... | H04B 10/6931 |
| 2020/0014463 A1* | 1/2020 | Tanaka | ............ | H03F 1/3211 |
| 2022/0109507 A1 | 4/2022 | Tanaka | | |

OTHER PUBLICATIONS

Extended European Search Report for Application No. 23211200.3, dated Apr. 26, 2024, 11 pages.

* cited by examiner

*Primary Examiner* — David W Lambert
(74) *Attorney, Agent, or Firm* — Morgan, Lewis & Bockius LLP

(57) ABSTRACT

After transmitting first electrical signals to a receiver, a transmitter receives a burst absent mode signal from the receiver. While in a ready state, the transmitter receives a signal including a data burst, converts the signal to second electrical signals, including a settled DC offset, and transmits the second electrical signals to the receiver. The receiver transmits the burst absent mode signal to the transmitter after receiving the first electrical signals, detects a presence of the second electrical signals. In response to detecting the presence of the second electrical signals, the receiver removes the DC offset from the second electrical signals to generate output signals, and causes transmitting the output signals to a subsequent device. The receiver removes the DC offset by causing an instruction to discharge AC coupling capacitors. The burst absent mode signal is generated using a host reset instruction or an internally generated instruction.

20 Claims, 25 Drawing Sheets

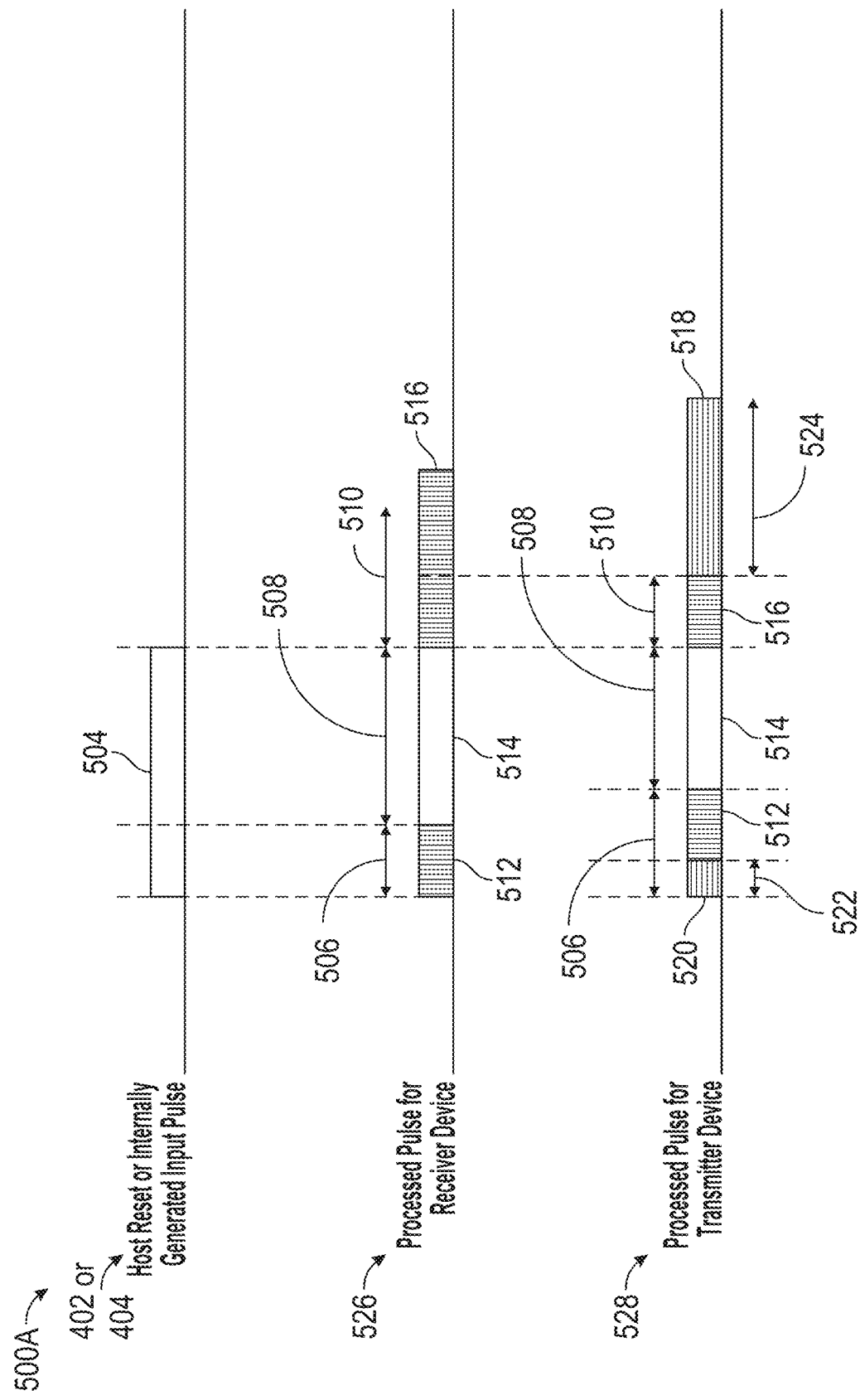

SYSTEMS AND METHODS FOR SIGNAL CONDITIONING AND NEGOTIATION

BACKGROUND

Some applications, such as a passive optical network (PON), need alternating current (AC) coupling capacitors that reside between transmitters (e.g., transimpedance amplifiers (TIA)) and receivers (e.g., limiting amplifiers). These AC coupling capacitors may be discrete or integrated components. At times, the transmitter device may have an input-level dependent direct current (DC) offset which prompts the need to discharge the AC coupling capacitors in order for the receiver device to recover the signal. In some systems, this DC offset is discharged using a "reset" signal provided by a host. However, because this reset signal is sent and simultaneously used by both the transmitter and receiver devices, there may not be adequate time allotted to sufficiently discharge the AC coupling capacitors. Additionally, there are scenarios (e.g., a registration period), where no host reset signal is provided at the start of an incoming data burst. Without the presence of a reset, the transmitter's output signals may remain toggled and result in a failed signal transmission attempt.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure.

FIG. 5A is a waveform diagram for an example modification of a host issued reset or an internally generated instruction by a burst event and pulse manager.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The inventors of the present disclosure have recognized the problems and disadvantages of the related art, including the deficiencies identified above in the Background section, have performed extensive research and experiments, and developed a new invention. The implementations of the present disclosure are thus directed to devices and methods that substantially obviate one or more problems due to limitations and disadvantages of the related art.

The present disclosure relates in general to transmitters and receivers, and more particularly to, for example, without limitation, systems and methods for signal conditioning and negotiation.

One or more advantageous aspects of the present disclosure enable using both the off-chip signaling, provided by the system host, and internally generated on-chip signaling. This allows for both the transmitter and receiver devices to negotiate an optimally settled electrical signal. In this way, it is possible to pass recovered data in a more efficient manner.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the appended drawings.

Figure 1A:
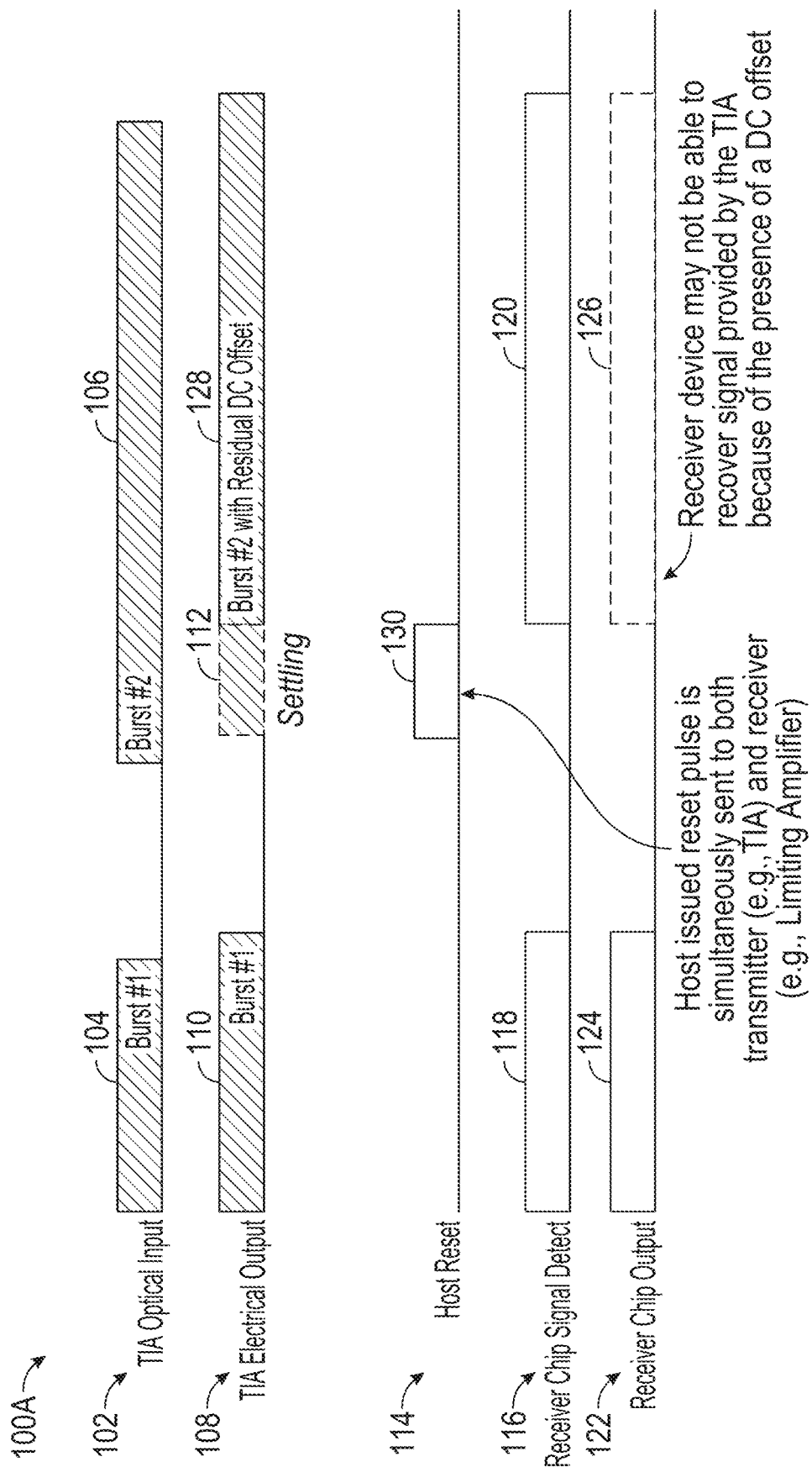
FIG. 1A shows an example of a waveform diagram that illustrates an example data burst scenario for a mission mode.

FIG. 1A shows an example of a waveform diagram that illustrates an example data burst scenario 100A for a mission mode. A transmitter device (which may be sometimes referred to as a transmitter) may receive an optical input 102 (sometimes referred to as an optical signal) and generate an electrical output 108 (sometimes referred to as an electrical signal). In the example shown in FIG. 1A, the transmitter device receives a data burst 104 and outputs a burst 110 which is an electrical output. The optical signal or optical input 102 may be single-ended. The transmitter device converts that optical signal 102 into the electrical signal 108 that is differential. In other words, the transmitter device may provide a differential output signal, including a positive output signal and a negative output signal.

A receiver device (which may be sometimes referred to as a receiver) takes that differential output signal from the transmitter device, as a differential input signal, and attempts to recover it, subtracting the positive and negative signals. The receiver device may contain a signal detection block which asserts upon detection of a signal from the transmitter device. In the example shown, the receiver device's signal detect block asserts (118) and allows for the recovered data signal from transmitter to be output as a signal 124.

Because the input signal of the transmitter device is a single-ended optical signal, the positive output and negative output signals of the transmitter device do not cross or may not sufficiently cross as a result of possessing a DC offset. The output signal includes a direct current (DC) offset. Although the output signals may toggle up and down, the output signals do not cross. The receiver device is unable to recover the signals because the positive output signal may stay high and the negative output signal may stay low. Because the positive output and negative output signals do not cross, the output signal appears as if it is a one minus a zero and stays that way constantly. In the example shown, when the transmitter device receives a second burst 106, the transmitter device outputs an electrical output 128 with a residual DC offset.

Some applications, such as passive optical network applications, include a set of alternating current (AC) coupling capacitors between the transmitter device and the receiver device or within the receiver device. Because the positive and negative output signals of the transmitter device do not cross due to the DC offset, the AC coupling capacitors may be shorted out for a brief period of time. This results in removing the transmitter device's DC offset at the receiver's input block side of the AC coupling capacitors. Then the signals start crossing and a data stream (which may be sometimes referred to as a burst) can be passed on to the downstream receiver device. This discharging of the AC coupling capacitors may be required.

A host of the system that includes the transmitter device and the receiver device is aware of this, and other limitations, and issues host reset signals 114 (which may be sometimes referred to as host rest instructions). In the example shown, the host issues a reset signal 130 (or a reset instruction). The reset signal is sent to both the transmitter device and receiver device. In some systems, the reset signal is used concurrently by the transmitter device and the receiver device. When the transmitter device uses the reset signal issued by the host and attempts to set up its gain and amplitude of its output signals, the receiver device discharges its AC coupling capacitors and attempts to remove all or part of the DC offset that the transmitter device is in the process of adjusting. In other words, the discharge occurs when the transmitter device's output signal and the DC offset are still in flux, so having the DC coupling capacitors is not effective for this mission mode type of scenario with a host-issued reset instruction 130 as well as a receiver device's internal signal detect block. The transmitter and receiver devices are provided with the host reset instruction to settle (see, e.g., 112) and generate their intended stable signals.

However, in most cases, the host's reset instruction 130 is either insufficiently long or used at an incorrect instance of time by the devices in the link which could result in a degradation to signal sensitivity, quality, and/or failure to meet the link timing budget. The transmitter device uses the reset signal to produce a settled electrical output signal that may often possess a DC offset while the receiver device is simultaneously expected to use the same reset signal to remove the transmitter device's DC offset during the same period of time while this DC offset is in flux of settling. This process is better performed serially rather than in parallel during the host reset signal. That is, the receiver device needs to remove the transmitter device's DC offset only after its DC offset has fully settled.

Figure 1B:
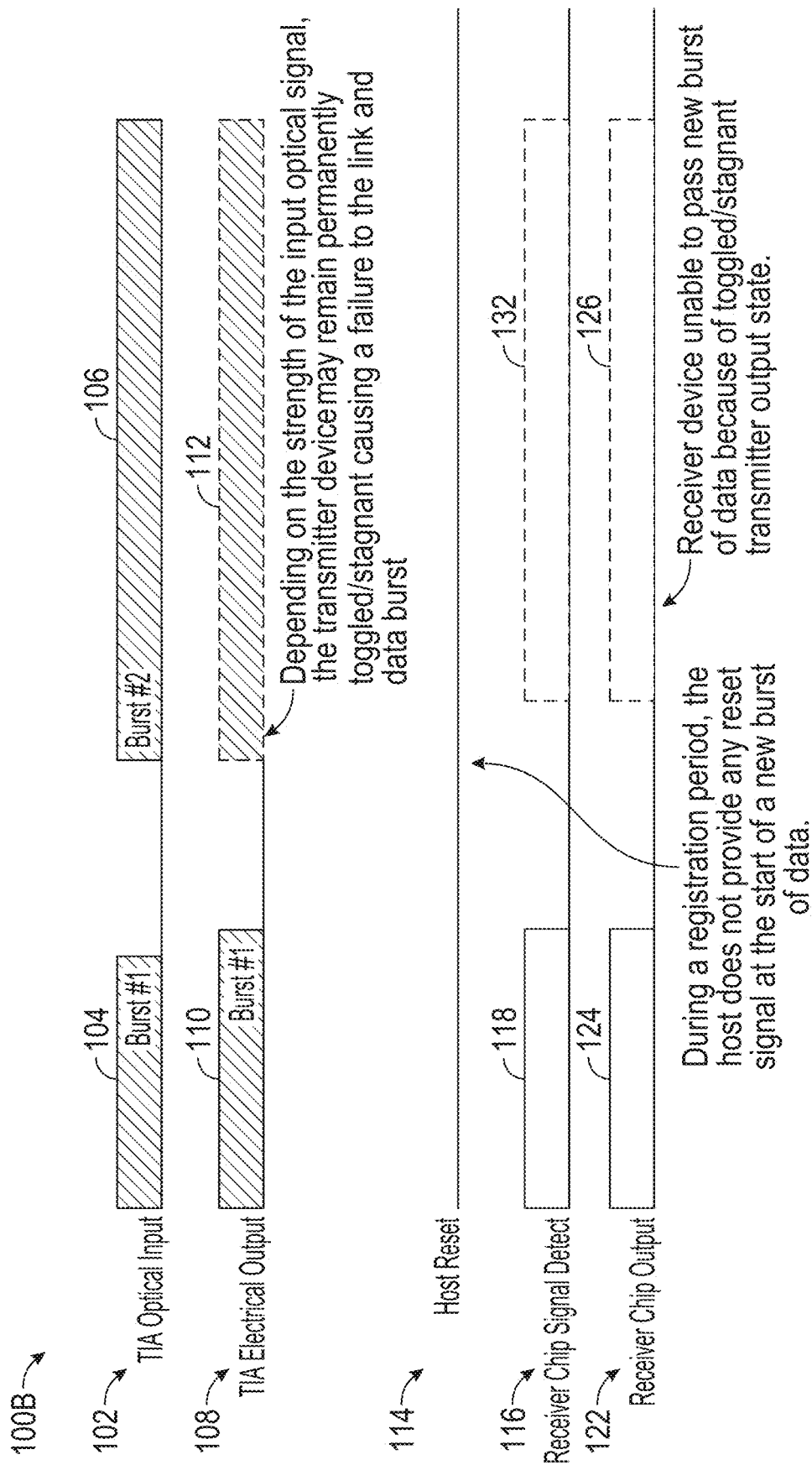
FIG. 1B shows an example of a waveform diagram that illustrates an example data burst scenario for a registration mode.

FIG. 1B shows an example of a waveform diagram that illustrates an example data burst scenario 100B for a registration mode. In this scenario, no host reset instruction 114 is issued. A host reset instruction may be sometimes referred to as a host reset signal. Hence, the transmitter's electrical output signals 108 may remain toggled or stagnant during an entire data burst resulting in a failure to pass a recoverable signal through the entire downstream link. During the registration mode or period, there is no reset instruction issued to either the transmitter or the receiver. Without that reset instruction, the transmitter may not even be able to set its appropriate gain to pass any kind of signal. Regardless of whether a DC offset is present at the output, as a result, the whole transmission (e.g., the whole burst of data) becomes a failed attempt.

To address at least some of the problems described above, in one or more aspects, the subject technology may advantageously use both off-chip signaling (e.g., a host reset signal 230 in FIG. 8B) provided by the system and on-chip signaling (e.g., an internally generated signal 326S in FIG. 8B) that allows the transmitter and receiver to negotiate with each other. With the negotiation, the receiver receives a signal from the transmitter and removes its DC offset and then passes the recovered data downstream, in a period of time according to the system specifications.

In many cases, the settling of signals is more effectively performed in a serial manner. That is, before the receiver (e.g., 204 of FIG. 2A) begins to allow its signals to settle, the receiver 204 may first wait for the transmitter (e.g., 202 of FIG. 2A) to do so in advance. In one or more advantageous aspects, the signal conditioning and negotiation process described herein allows a system designer to use available signals to issue instructions at specific times and for specific periods to the transmitter 202 and/or the receiver 204.

Figure 8A:
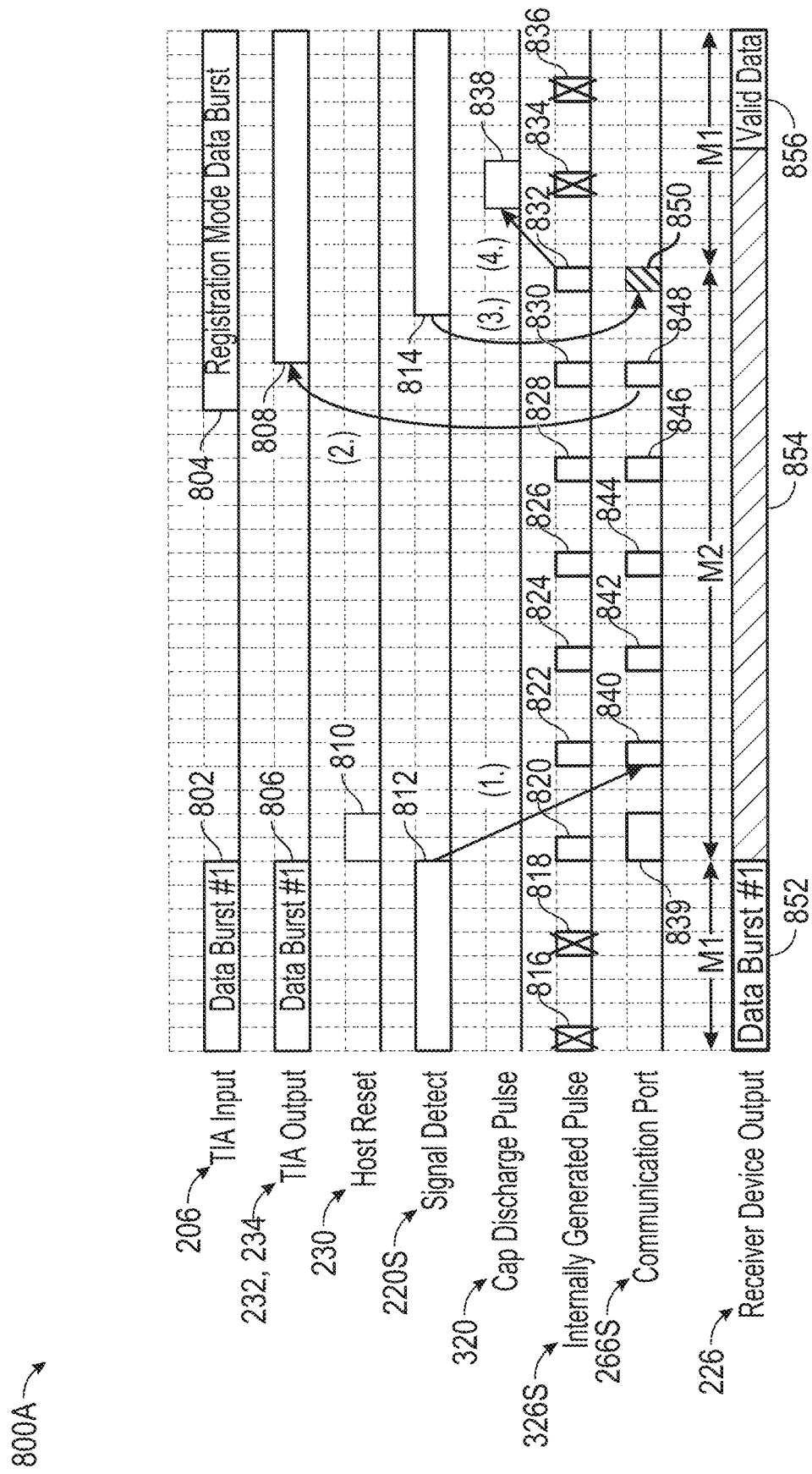
FIG. 8A shows waveforms for an example communication scheme during a registration mode.
Figure 8B:
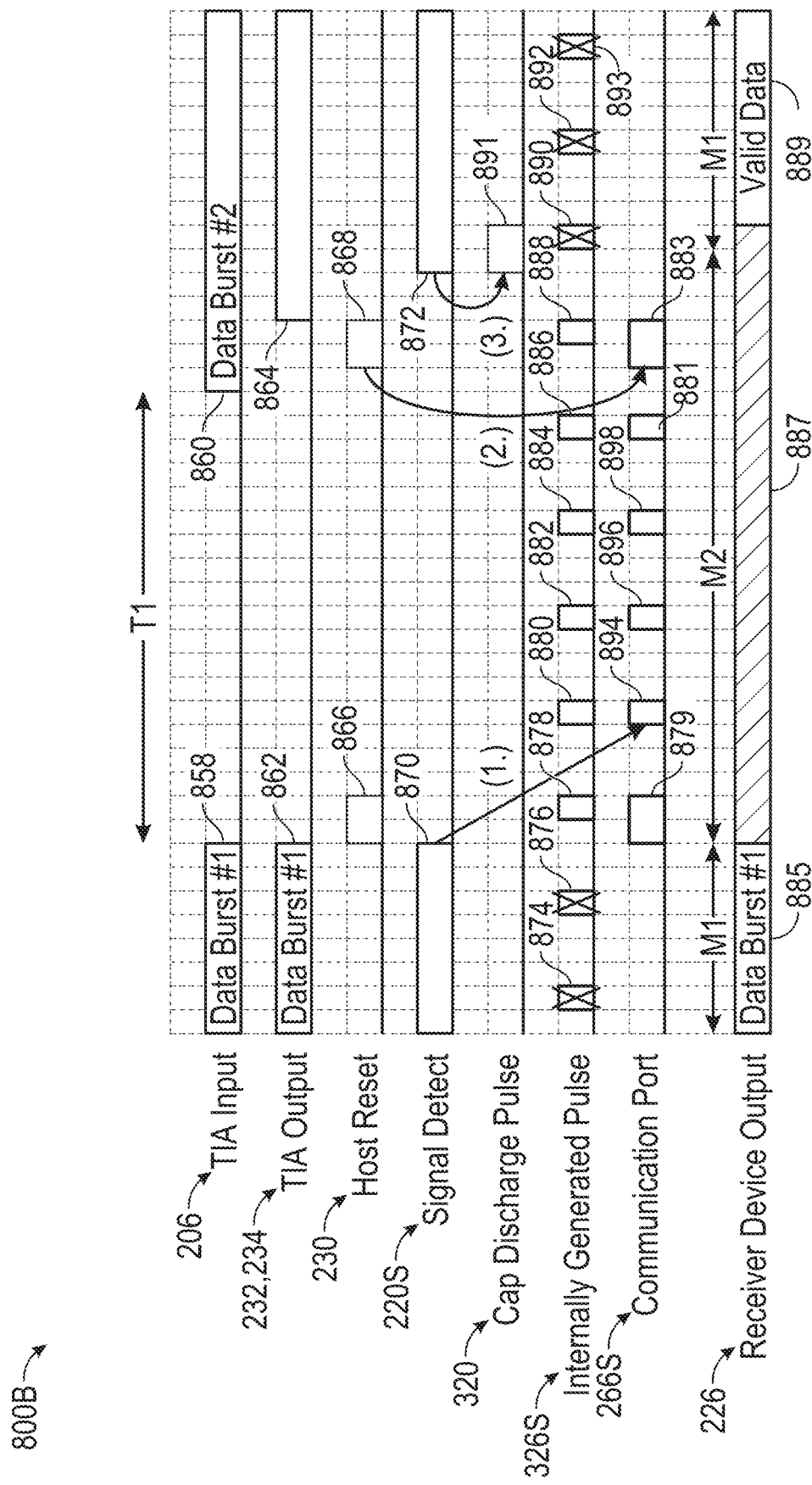
FIG. 8B shows waveforms for an example communication scheme during a mission mode.

The available signals described in the foregoing sentence may include, for example, one or more host reset instructions (e.g., 868 in FIG. 8B) from a host and/or one or more receiver-generated signal detect (e.g., 812 and/or 814 in FIG. 8A, or 870 and/or 872 in FIG. 8B). The instructions issued to the transmitter 202 may include, for example, (i) one or more reset instructions (e.g., 840, 842 844, 846, 848 and/or 850 in FIG. 8A, or 894, 896, 898, and/or 881 in FIG. 8B) generated based on one or more internally generated instructions (e.g., 326S in FIG. 8A or 8B) and/or (ii) one or more reset instructions (e.g., 883 in FIG. 8B) generated based on a host reset signal (e.g., 868 in FIG. 8B). The instructions issued to the component(s) of the receiver 204 may include, for example, a trigger signal or a capacitor discharge instruction (e.g., 320 in FIG. 3, 838 in FIG. 8A, or 891 in FIG. 8B).

Some systems for passive optical network (PON) signal settling resolve transmitter device input-level dependent DC offset by issuing a host reset instruction to the transmitter and receiver devices. This only applies to a mission mode burst data signaling scenario and is prone to result in a violation to the link timing budget as the receiver device is unable to recover the incoming data until the signal's DC offset naturally converges based on the device's input termination time constant. During a registration scenario, there is no host reset instruction issued in which case the burst of data may never be passed through the link.

In contrast, in one or more aspects, the signal conditioning and negotiation process of the subject technology described herein advantageously allows the system designer to control the relative timing, frequency and width (or length) of instructions issued to either or both the transmitter and receiver devices. Advantages of the signal conditioning and negotiation process of the subject technology include, among others, allowing system designers to use host reset information (e.g., 230 in FIG. 2A-2I, 3, 8A or 8B) and/or the receiver's internally generated signal detect signal (e.g., 220S in FIG. 2B, 2D, 2F, 2I, 8A or 8B) to issue one or more instructions (e.g., one or more pulses of 266S and/or one or more pulses of 320) to the transmitter and/or receiver devices in a staggered manner. That is, the mechanism can issue an initial instruction (e.g., 883 in FIG. 8B) to the transmitter device to allow it to settle prior to issuing a second instruction (e.g., a capacitor discharge pulse 891) to the receiver device. This second instruction can be generated in parallel with the initial instruction (and this second instruction is provided to the receiver device's component after the initial instruction is sent to the transmitter device) to enable the receiver device to begin its DC offset removal process in the presence of a steady signal from the transmitter device.

In one or more aspects, an input may sometimes refer to an input signal, and an output may sometimes refer to an output signal, and vice versa. An input may include one or more inputs. An output may include one or more outputs. A signal may include one or more signals. An input signal may include one or more input signals. An output signal may include one or more output signals. A signal may sometimes refer to a pulse and vice versa. A pulse may include one or more pulses. An instruction may sometimes refer to a pulse and vice versa. An instruction may include one or more instructions. In one or more aspects, a pulse may be an example of an instruction. An instruction may be, or may include, a signal or a pulse. The foregoing provides examples, and the subject technology is not limited thereto.

Figure 2A:
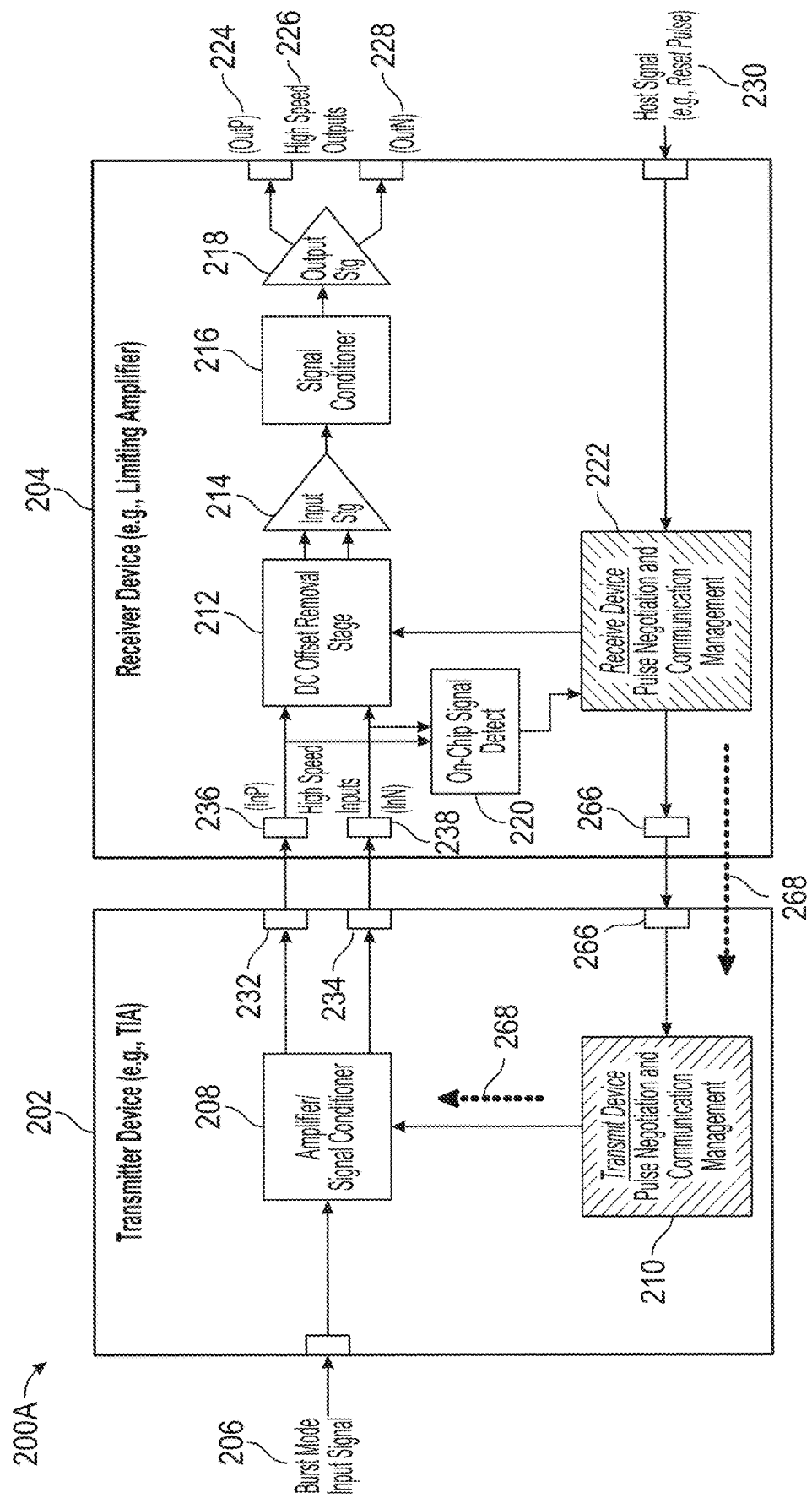
FIGS. 2A-2I illustrate an example circuit and an example of a signal conditioning and negotiation process during a registration period.

FIGS. 2A-2I illustrate an example circuit and an example of a signal conditioning and negotiation process during a registration period. FIG. 2A illustrates an example of a schematic diagram of a transmitter and a receiver during a first example step 200A of the signal conditioning and negotiation process. In some aspects, a process may sometimes refer to an algorithm or a method. A process may include one or more processes.

In FIG. 2A, a transmitter 202 may include an amplifier and/or signal conditioner 208, a pulse negotiation and communication management controller 210, and a communication port 266. The transmitter 202 may be sometimes referred to as a transmitter device, a transmit device, a Tx device, and vice versa. The transmitter may be, for example, a transimpedance amplifier (TIA).

The transmitter 202 may receive a burst mode input signal 206. The burst mode input signal 206 may be sometimes referred to as an input, an optical input signal, an input data burst, an input signal, or an optical signal. The amplifier and/or signal conditioner 208 of the transmitter 202 may process the burst mode input signal 206 and output a differential output signal, including a positive output signal 232 and a negative output signal 234. These output signals are input to a receiver 204 as input signals 236 and 238, which may be a differential input signal. The input signals 236 and 238 may be sometimes referred to as high-speed inputs.

The receiver 204 may include an on-chip signal detection circuit 220, a DC offset removal stage 212, an input stage 214, a signal conditioner 216, an output stage 218, and a communication port 266. The on-chip signal detection circuit 220 may be sometimes referred to as an on-chip signal detect, a signal detect, a signal detect circuit, an on-chip signal detection circuit, or the like. The DC offset removal stage 212 may be sometimes referred to as a DC offset removal stage circuit.

The receiver 204 may be sometimes referred to as a receiver device, a receive device, an Rx device, and vice versa. The receiver may be, for example, a limiting amplifier. The DC offset removal stage 212 may remove DC offsets in the input signals 236 and 238, and provide its output signals to the input stage 214. The input stage 214 may in turn output a signal to the signal conditioner 216 which may output a signal to the output stage 218. A high level illustration for these blocks is shown and described in reference to FIG. 3. The input stage (which may be a simple signal slicer, limiting amplifier, a complex equalizer (EQ), or combination); blocks inside the receiver should be considered as generic signal processing or conditioning blocks and may include a gain stage, bandwidth filter, clock and data recovery (CDR), and/or trace driver. The signal conditioner 216 may re-adjust its gain based on the incoming signal but only after receiving an instruction at its communication port. The signal conditioner 216 may be a simple buffer or a complex CDR or a combination of both. The signal conditioner 216 may use a logic signal (e.g., signal 322 in FIG. 3, which is not necessarily a pulse) to decide whether to recover or pass the output of 214 in FIG. 2A or 304 in FIG. 3. The output stage 218 may generate a positive output signal 224 and a negative output signal 228 (which may be sometimes referred to as high-speed output signals 226).

The receiver 204 and the transmitter 202 have their respective communication port 266. The dotted bold lines indicate signals generated as part of the signal conditioning and negotiation process and provided from the receiver 204 to the transmitter 202 and then from the pulse negotiation and communication management controller 210 to the amplifier and/or signal conditioner 208. A signal 268 may be generated by the receiver 204 (e.g., a signal generated by a pulse negotiation and communication management controller 222 of the receiver). At the end of an output burst of data, the receiver 204 may begin sending, through its communication port 266, a processed burst not-present signal (e.g., a signal in the signaling mode 242 of FIG. 2B, 2D, 2F or 2I), which may include a signal generated based on a host reset signal issued by a host or based on an internally generated instruction. The burst not-present signals enable the transmitter 202 to continuously be in a ready state.

In connection with FIGS. 2A-2I, 8A and 8B, a burst not-present signal (e.g., a signal in the signaling mode 242) may be sometimes referred to as a burst not-present mode signal, a burst absent signal, a burst absent mode signal, or the like. A burst not-present signal (e.g., a signal in the signaling mode 242) may include an instruction (e.g., 839, 840, 842 844, 846, 848, or 850 in FIG. 8A, or 879, 894, 896,

898, 881 or 883 in FIG. 8B), where an instruction(s) may be referred to as a reset instruction(s). A burst not-present signal may include one or more burst not-present signals.

Figure 2B:
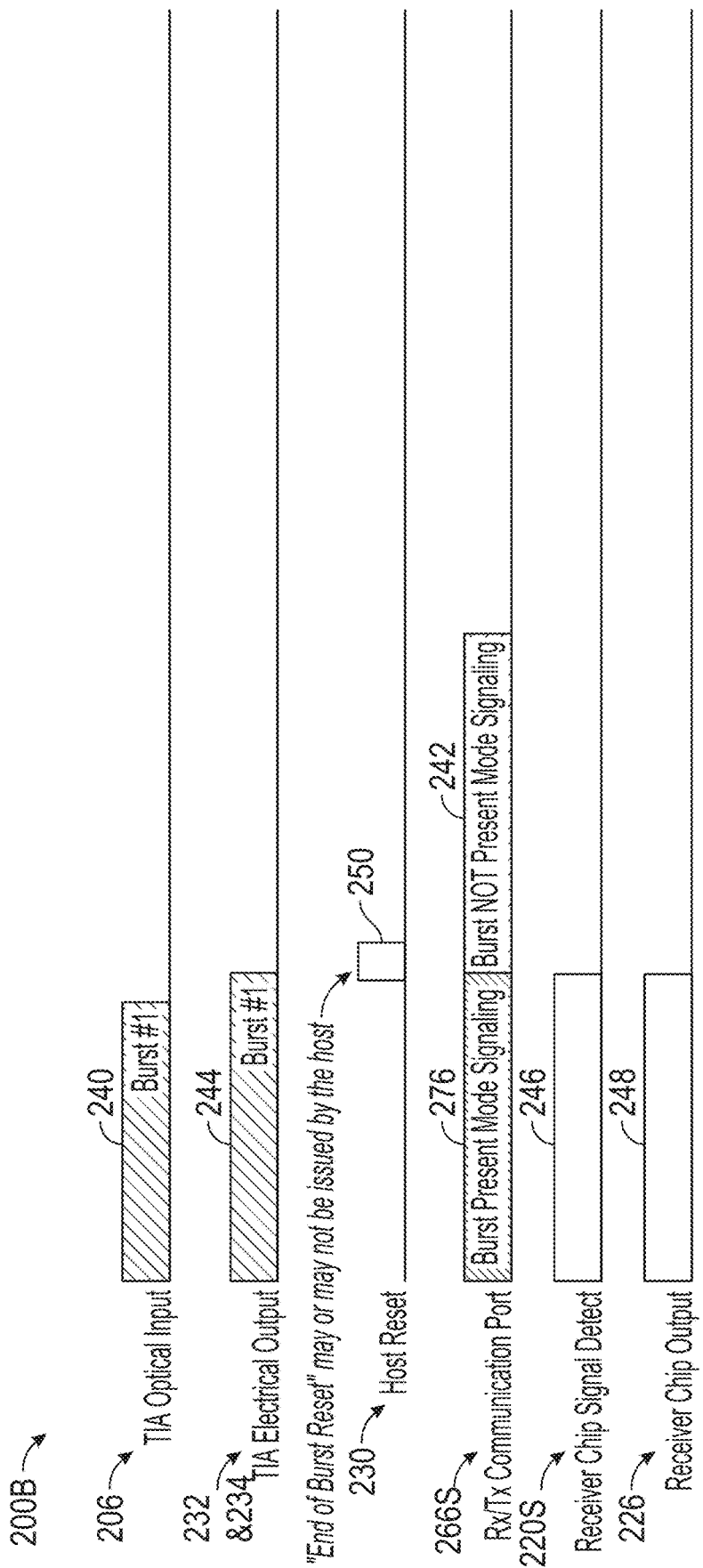

In one or more examples, the receiver 204 may begin to transmit to the transmitter 202 one or more burst not-present signals (e.g., one or more signals in the signaling mode 242; 839, 840, 842 844, 846, 848 and/or 850 in FIG. 8A; or 879, 894, 896, 898, 881 and/or 883 in FIG. 8B), (i) when (or shortly after) the receiver 204 stops detecting a set of output signals 232 and 234 (e.g., an output burst of data 244, 806, or 862) of the transmitter 202 or (ii) when the host issues an end of burst reset pulse (e.g., 250 in FIG. 2B, 810 in FIG. 8A, or 866 in FIG. 8B). When any of the foregoing events of (i) or (ii) occurs, this prompts the receiver 204's signal detect circuit 220 to immediately de-assert (e.g., the signal 812 in FIG. 8A stops; or the signal 870 in FIG. 8B stops). Thereafter, the receiver 204 may stop transmitting to the transmitter 202 one or more burst not-present signals, after the receiver 204 begins/re-begins to detect another set of output signals 232 and 234 (e.g., an output burst of data 254, 808, or 864) from the transmitter 202. The foregoing process may be repeated (e.g., when the receiver 204 stops detecting the another set of output signals 232 and 234, and then later when the receiver 204 starts to detect yet another set of output signals 232 and 234). In FIG. 8A, a host-issued end-of-burst reset pulse 810 is received by the receiver 204 and is provided as the pulse 839 to the communication port 266S by the receiver 204; thus, the pulse 839 may represent the host-issued end-of-burst reset pulse 810. In FIG. 8B, a host-issued end-of-burst reset pulse 866 is received by the receiver 204 and is provided as the pulse 879 to the communication port 266S by the receiver 204; thus, the pulse 879 may represent the host-issued end-of-burst reset pulse 866.

When the receiver 204 sends a burst not-present signal to the transmitter 202, the transmitter 202 can be in a ready state so that when the transmitter 202 receives an input signal 206 (e.g., 252 in FIG. 2D, 804 in FIG. 8A, or 860 in FIG. 8B), the transmitter 202 is ready to convert the input signal 206 to output signals 232 and 234 based on the burst not-present signal (e.g., a reset pulse and/or a train of pulses).

FIG. 2B shows example waveforms 200B for the step 200A of the signal conditioning and negotiation process. Referring to FIGS. 2A and 2B, the input 206 includes the tail end of a previous burst of data 240. The transmitter outputs 232 and 234 include an output data burst 244. The host may or may not issue an end of burst reset 250. The receiver 204 may stop being in a burst present mode signaling 276 and switch to the burst not-present mode signaling 242 (which may be sometimes referred to as burst absent mode signaling or burst absent signaling). The burst not-present mode signaling 242 may include one or more instructions generated by the receiver 204 based on one or more host reset instructions (if present) or based on one or more internally generated instructions. The burst present mode signaling 276 may include one or more instructions generated by the receiver 204 based on one or more host reset instructions (if present), but not based on internally generated instructions. The receive (Rx)/transmit (Tx) communication ports 266 may operate in the burst present mode signaling 276 or the burst not-present mode signaling 242. The Rx/Tx communication port signal 266S may be provided from the pulse negotiation and communication management controller 222 to the communication port 266 of the receiver 204 and then from the communication port 266 of the receiver 204 to the communication port 266 of the transmitter.

The signal detect circuit 220 may generate a receiver chip signal detect 220S. The receiver chip signal detect 220S may be sometimes referred to as a signal detect signal, a signal detect, a signal detection signal, or signal detection information. The signal detect 220S may include a first signal 246. The output stage 218 may generate an output or an output signal 226. The output signal 226 may include a second signal 248. In FIGS. 2A-I, signal 248 may be the processed, recovered, or reconditioned data burst signal of 244 (electrical output from the transmitter).

The end of burst reset 250 may inform the signal detect circuit 220 that the data burst has completed, causing the signal detect circuit 220 to go low, de-assert itself, and to start seeking a new incoming signal. This in turn causes the pulse negotiation and communication management controller 222 to be notified that the signal detection block 220 has de-asserted.

Figure 2C:
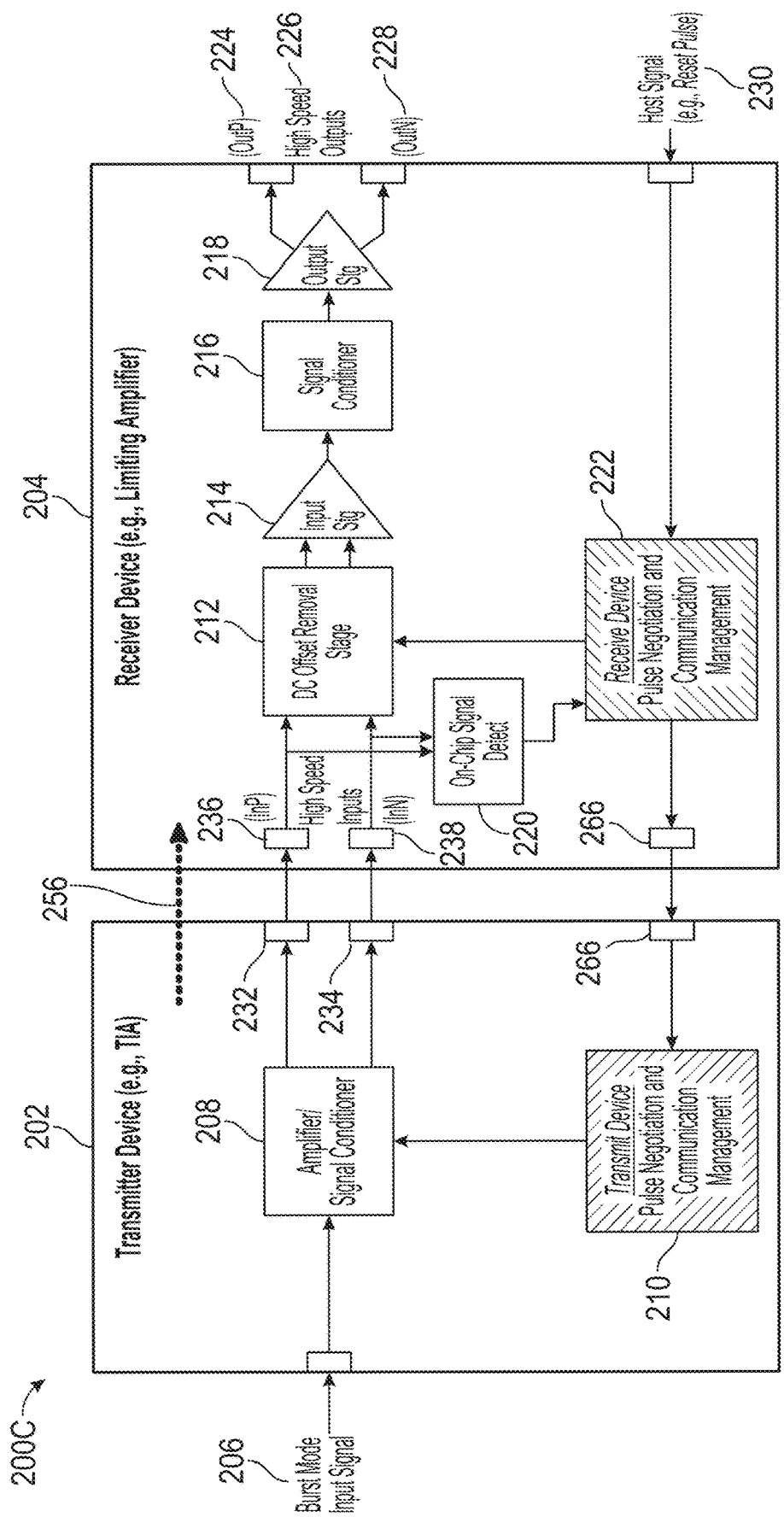
Figure 2D:
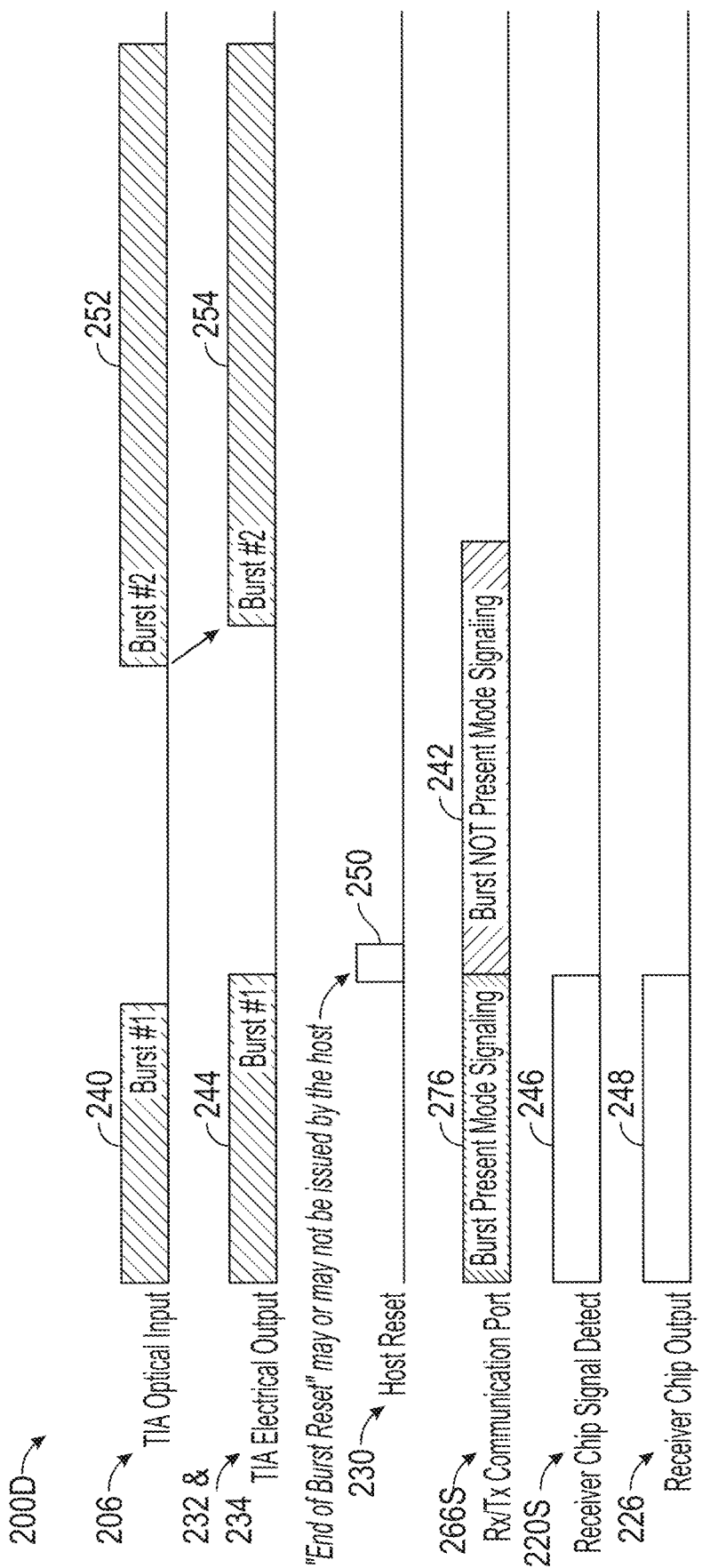

FIG. 2C illustrates an example circuit during an example second step 200C of the signal conditioning and negotiation process. FIG. 2D shows example waveforms 200D for the step 200C. The devices and components shown in FIG. 2C may be the same or substantially the same as those described above with reference to FIG. 2A, and thus, the repetitive descriptions thereof may be omitted for brevity.

Referring to FIGS. 2C and 2D, the input signal 206 of the transmitter 202 may be a new optical burst of data 252 arriving at the input node of the transmitter 202. The signal in the signaling mode 242 may be a train of pulses transmitted by the receiver 204 at specific intervals and have a specific width that depends on the requirements of the transmitter 202. The signaling mode 242 causes the transmitter 202 to be ready and/or in a state which prompts it to re-adjust its gain and/or the signal recovery circuitry, upon receiving a new burst of data 252; the signaling mode 242 stays until after the new optical burst of data 252 arrives. The signaling mode 242 causes the transmitter 202 to set its gain appropriately and to output the signal 254 which has a correct amplitude. The signal 254 has a DC offset but the actual signal on top of (or including) the DC offset has the correct amplitude. In this way, as a result of the signaling provided through the receiver's communication port 266, the upstream transmitter 202 is able to adequately condition the incoming optical signal (e.g., 252) and correctly convert it into an electrical output signal (e.g., 254).

Figure 2E:
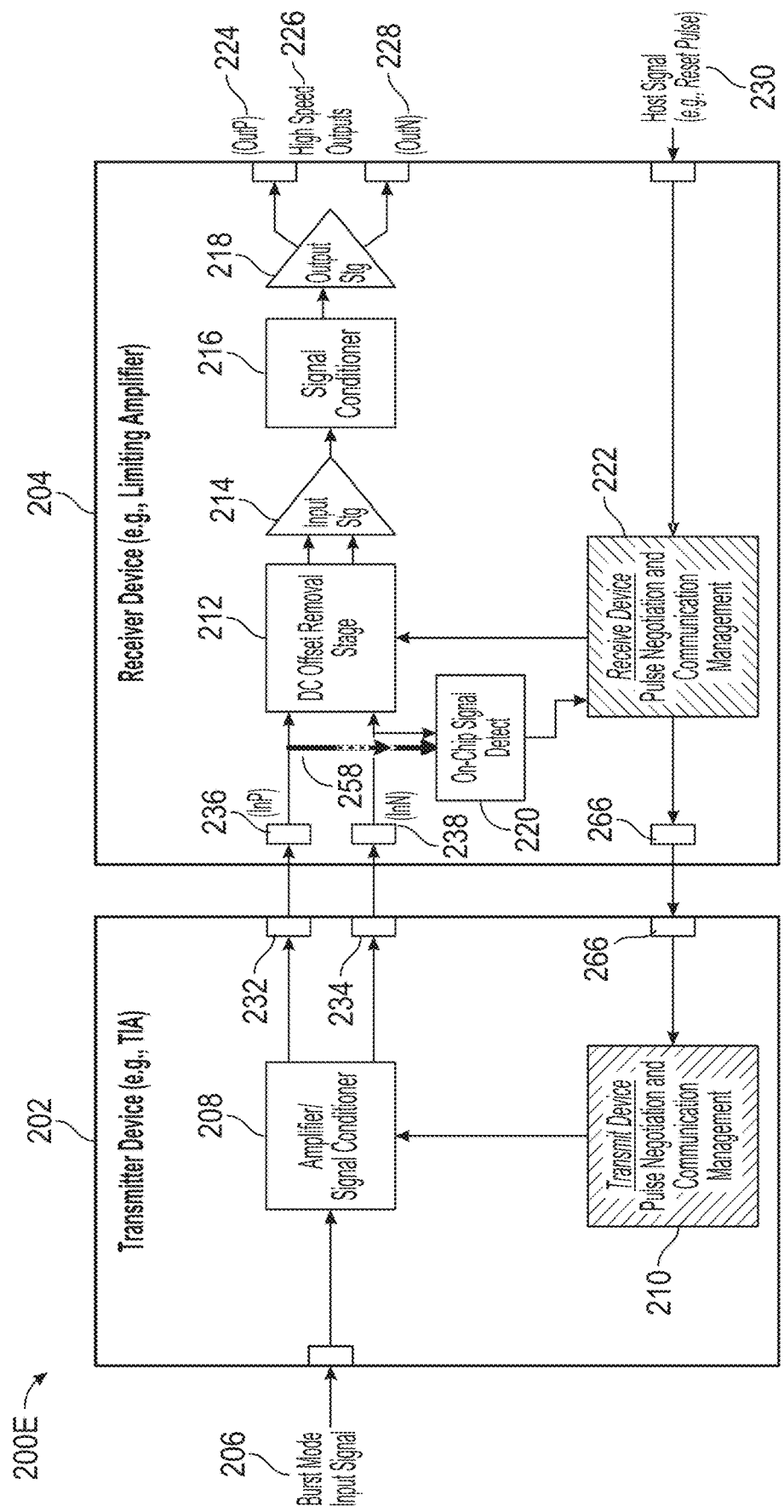
Figure 2F:
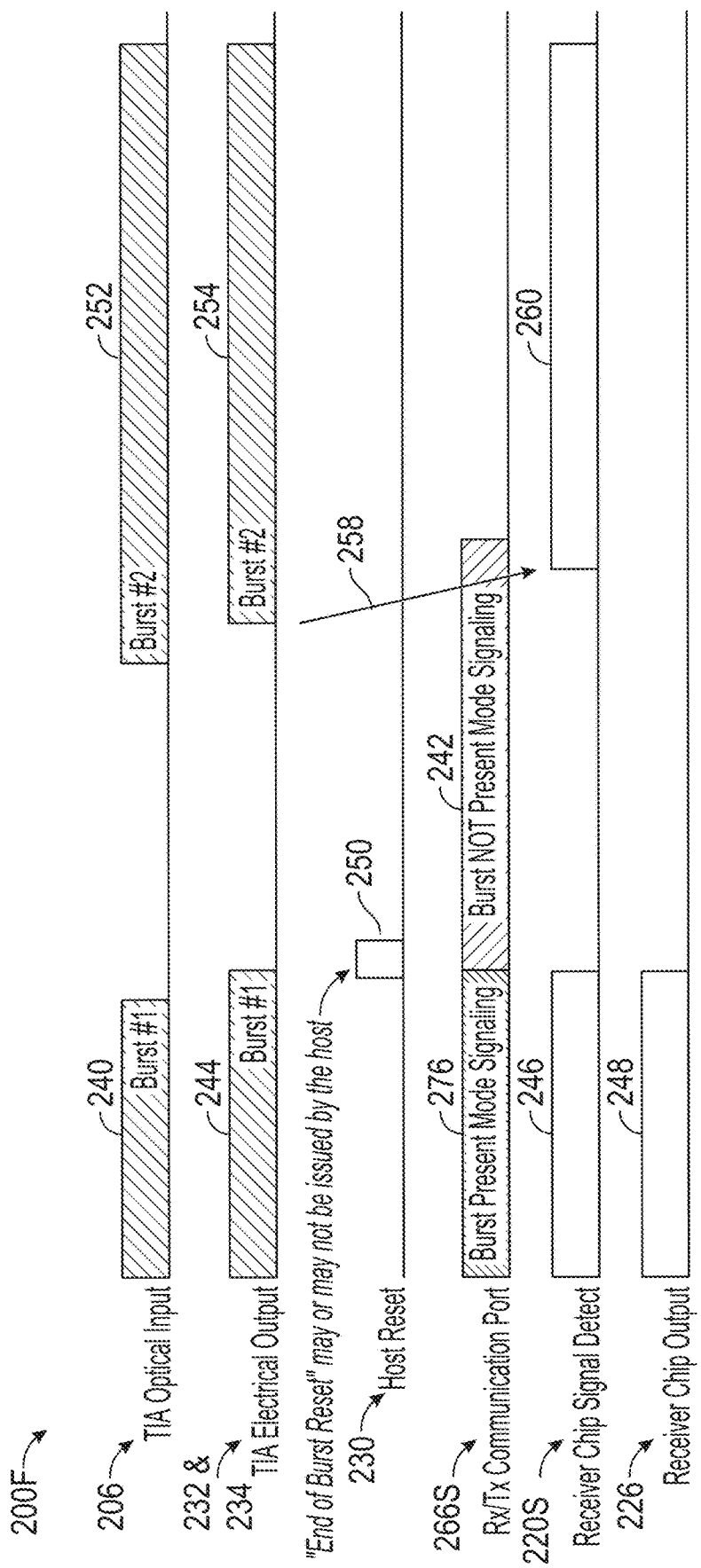

FIG. 2E illustrates an example circuit during an example third step 200E of the signal conditioning and negotiation process. FIG. 2F shows example waveforms 200F for the step 200E. The devices and components shown in FIG. 2E may be the same or substantially the same as those described above with reference to FIG. 2A, and thus, the repetitive descriptions thereof may be omitted for brevity. Referring to FIGS. 2E and 2F, the correctly converted optical to electrical signal 254 from the transmitter 202 is provided to the receiver 204 as input signals 236 and 238. These are subsequently detected by the receiver's signal detect circuit 220 (as illustrated by the path 258) even though there may be a DC offset present. When the signal detect circuit 220 detects the signal 254 (received as the signals 236 and 238), the signal detect circuit 220 generates a detection signal 260 (which is similar to the signal 814 shown in FIG. 8A).

Figure 2G:
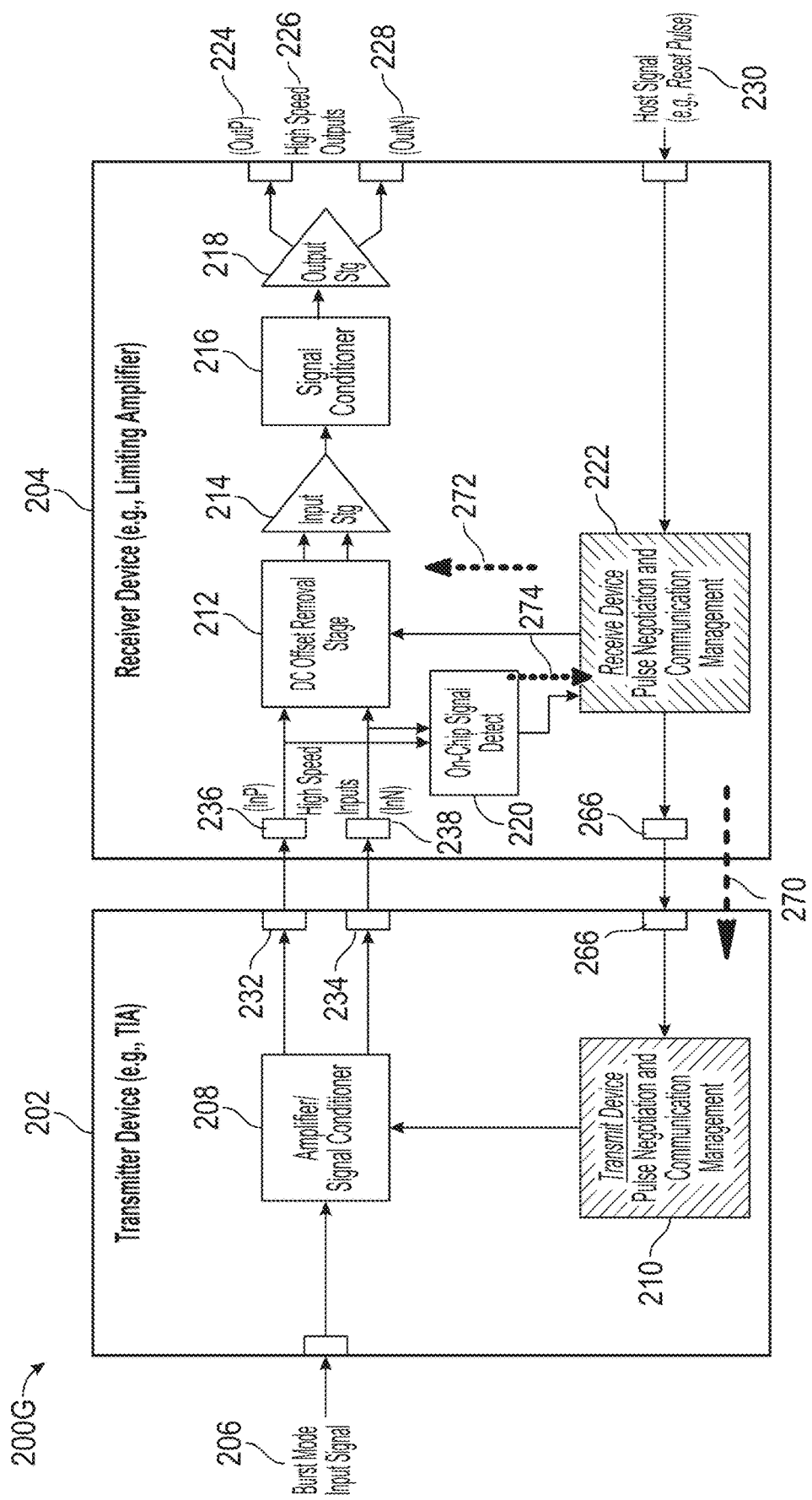

FIG. 2G illustrates an example circuit during an example fourth step 200G of the signal conditioning and negotiation process. The devices and components shown in FIG. 2G may be the same or substantially the same as those described above with reference to FIG. 2A, and thus, the repetitive descriptions thereof may be omitted for brevity. Referring to FIG. 2G, when the signal detect circuit 220 detects a signal (e.g., 236 and 238) from the transmitter 202, the signal detect circuit 220 may assert the presence of a valid incoming data. The signal detect circuit 220 may send this assertion (or the assertion signal) to the pulse negotiation and communication management controller 222 (see the arrow 274). The pulse negotiation and communication management controller 222 may then, via the communication ports 266 of the receiver 204 and transmitter 202 (see the arrow 270), alert the transmitter 202 (e.g., the transmitter's pulse negotiation and communication management controller 210) of valid data. The pulse negotiation and communication management controller 222 may also provide a trigger signal (e.g., a pulse 838 in FIG. 8A) to the DC offset removal stage 212 to trigger a DC offset removal process to be performed by the DC offset removal stage 212 (see the arrow 272). In one or more examples, triggering the DC offset removal process may occur after alerting the transmitter 202 of valid data.

Figure 2H:
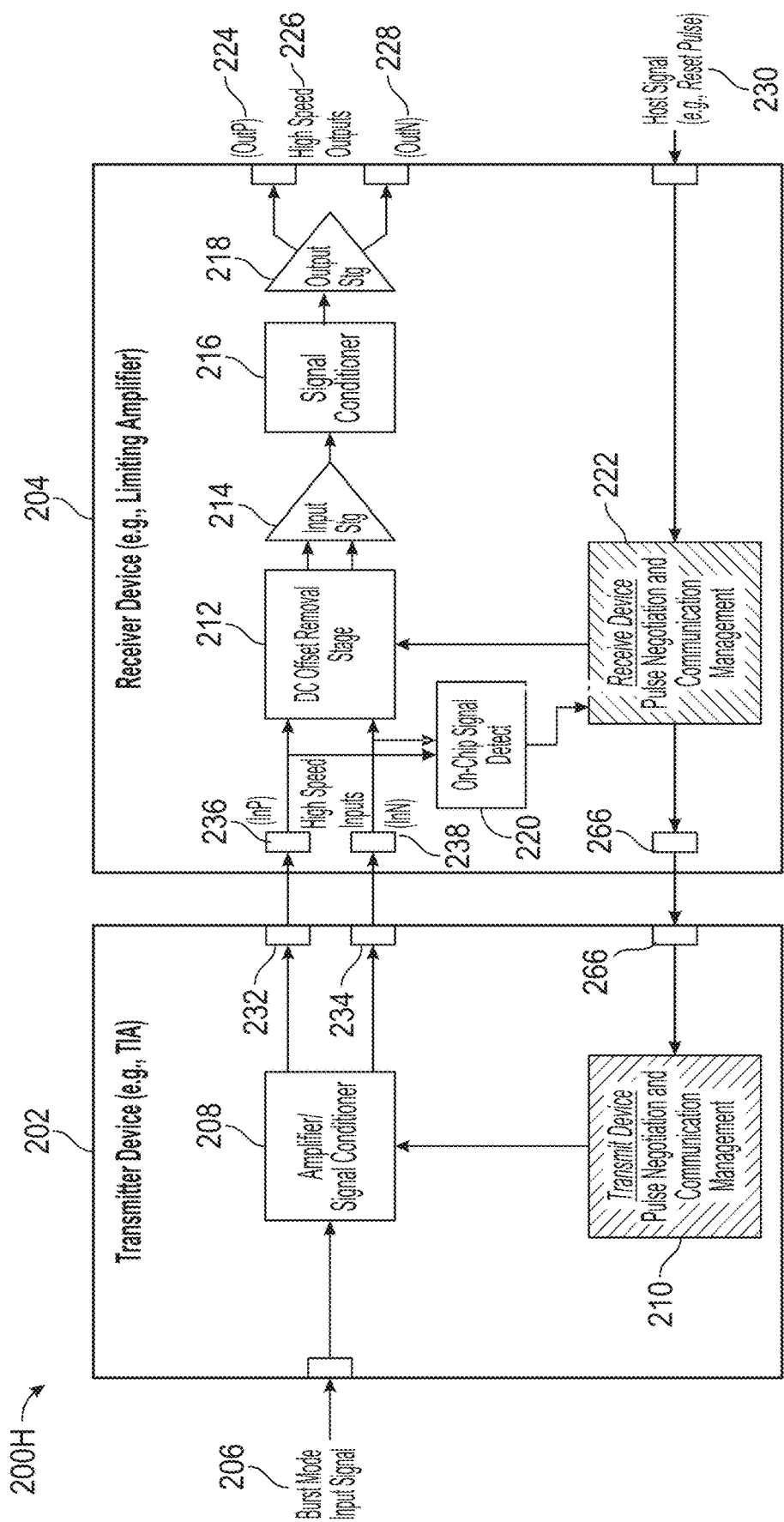
Figure 2I:
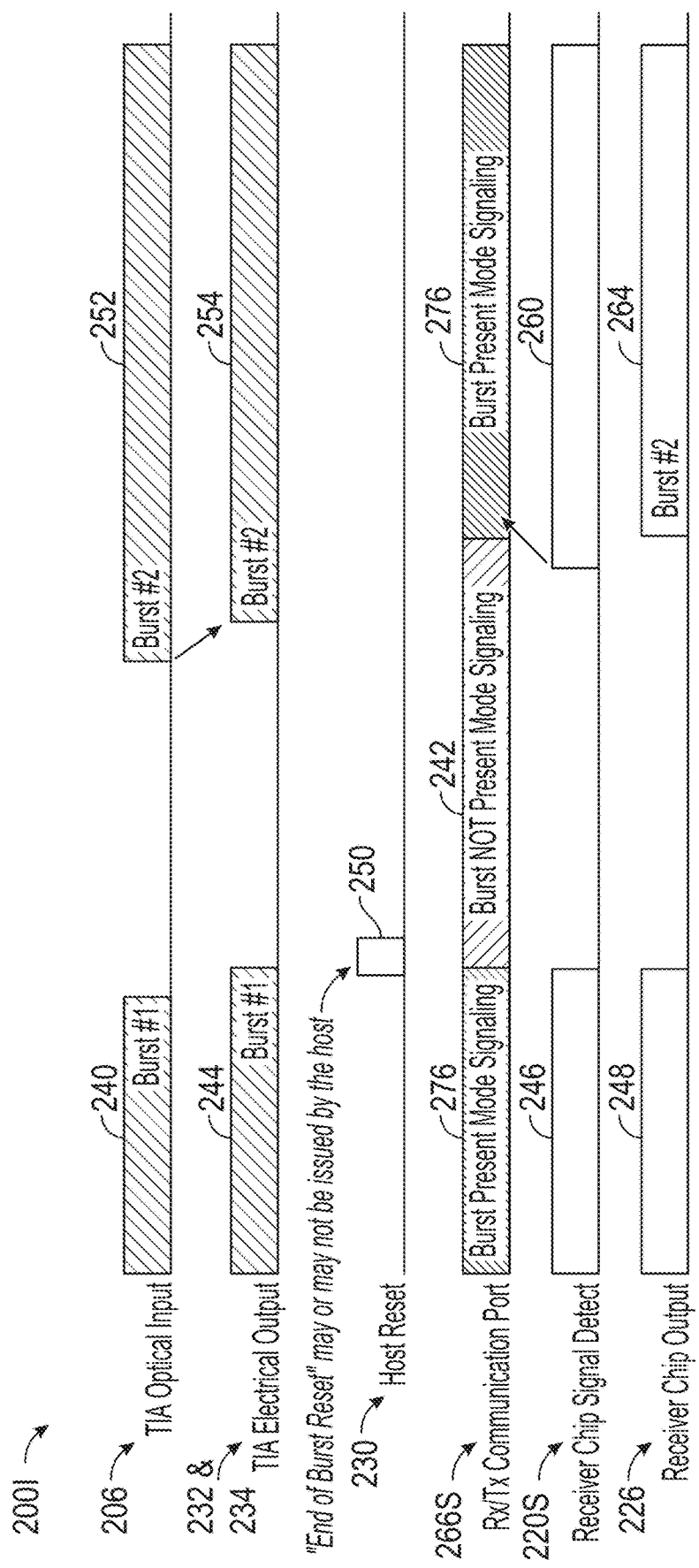

FIG. 2H illustrates an example circuit during an example fifth step 200H of the signal conditioning and negotiation process. FIG. 2I shows example waveforms 200I for the step 200H. The devices and components shown in FIG. 2H may be the same or substantially the same as those described above with reference to FIG. 2A, and thus, the repetitive descriptions thereof may be omitted for brevity. Referring to FIGS. 2H and 2I, upon completion of removal of the DC offset by the DC offset removal stage 212, the receiver 204 begins passing valid and recovered data (i.e., the output signal 226) to a downstream device in the link. This is also shown by burst 264 in FIG. 2I. The pulse negotiation and communication management controller 222 may revert to sending signals to the upstream transmitter 202 in the burst present mode signaling 276.

While FIGS. 2A, 2C, 2E, 2G and 2H illustrate an example of the structure and components of the transmitter 202 and the receiver 204 used in a registration mode, such structure and components may be the same or similar to those of the transmitter 202 and the receiver 204 used in a mission mode. FIGS. 2B, 2D, 2F and 2I illustrate an example of waveforms generated, received, transmitted, or processed during a registration mode. Other examples of waveforms for a registration mode are illustrated, for example, in connection with FIG. 8A. Examples of waveforms for a mission mode is illustrated, for example, in connection with FIG. 8B.

Figure 3:
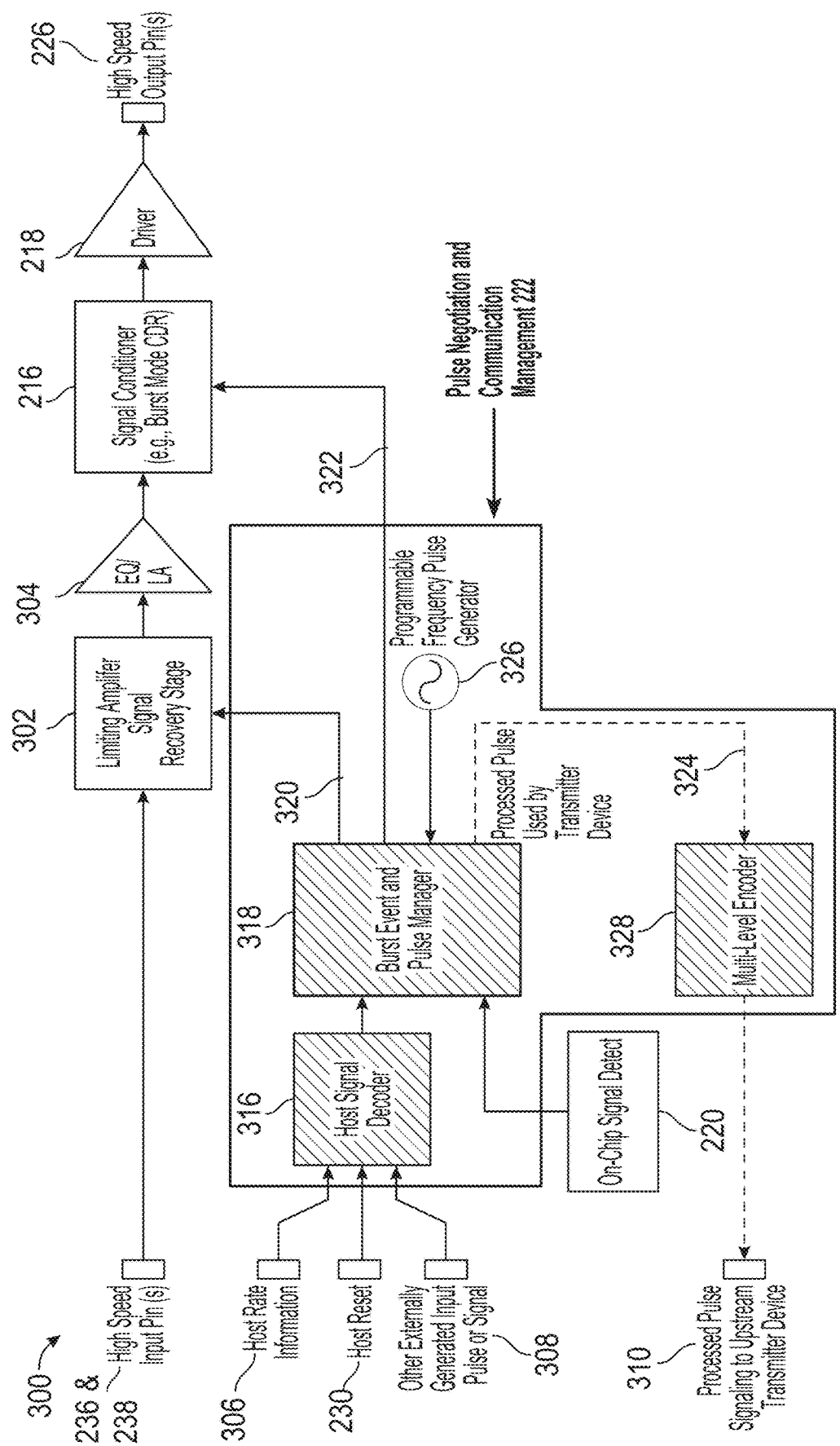
FIG. 3 is a schematic diagram of an example circuit with pulse negotiation and communication management, according to some aspects.

FIG. 3 is a schematic diagram of an example circuit 300 with the pulse negotiation and communication management controller 222, according to some aspects. The circuit 300 may be a part of the receiver 204.

The example circuit 300 may include inputs pins for the inputs 236 and 238, a limiting amplifier signal recovery stage 302, an equalizer 304, the signal conditioner 216, the driver 218, output pins for the high speed output 226, the pulse negotiation and communication management 222, a host rate information 306, the host reset 230, other externally generated input pulse or signal 308, the on-chip signal detect 220 and processed pulse signaling 310 to upstream transmitter device.

The limiting amplifier signal recovery stage 302 may correspond to (or be included in) the DC offset removal stage 212. The equalizer or limiting amplifier (EQ/LA) 304 may correspond to (or be included in) the input stage 214 of the receiver 204. The output of the equalizer/limiting amplifier 304 may be input to the signal conditioner 216 (e.g., a burst mode clock-and-data recovery (CDR)), the output of which is input to the driver 218 (which may be sometimes referred to as the output stage) which generates the high-speed output 226.

The pulse negotiation and communication management controller 222 may include a host signal decoder 316, a burst event and pulse manager 318, a programmable frequency pulse generator 326 and a multi-level encoder 328. The host may provide rate information (e.g., host rate information 306), a host reset signal (e.g., the host reset 230 signals), and/or other externally generated input pulse or signal 308 (e.g., the host reset and the rate information through a multi-level signal), which are input to the host signal decoder 316. In the example of passive optical networks, a medium access control (MAC) device may be the host. The techniques described may be used with any data burst mode signaling applications. Incoming bursts of data may have different rates. The host rate information signal provides the transmitter and/or receiver devices, rate information of the next data burst. Sometimes host reset and host rate signals are provided on a single pin in a tri-level signaling scheme where low, mid, and high levels indicate rate and reset information. In such cases, the decoder block decodes and extracts rate and reset information from this tri-level signal. It should be noted that such a signaling scheme is part of the system (e.g., ITU) standard. The host signal decoder 316 may decode its input signals and provide the decoded host signals to the burst event and pulse manager 318. The on-chip signal detect circuit 220 may detect signals received from the transmitter 202 and provide signal detection information (e.g., 220S in FIG. 2B, 2D, 2F, 2I, 8A, or 8B) to the burst event and pulse manager 318. When there is a signal from the transmitter 202, the receiver 204 may send rate information to the transmitter 202, encoded as a bi-level or a multi-level signal. In other words, when the burst event and pulse manager 318 receives the signal detection information from on-chip signal detect circuit 220, the burst event and pulse manager 318 provides the rate information 306 to the multi-level encoder 328, and the multi-level encoder 328 encodes it and provides it to the transmitter 202. A programmable frequency pulse generator 326 may generate instructions (which may be sometimes referred to as pulses or as a train of pulses) for the burst event and pulse manager 318. The programmable frequency pulse generator 326 may be programmed to indicate how often the train of pulses is output to the transmitter 202 through the communication port 266, during guard time of a registration period, during guard time in mission mode, or during a time period when there is no presence of data. Processed pulse 324 output by the burst event and pulse manager 318 may be passed to a multi-level encoder 328 which may encode the pulse and output a processed pulse (or an encoded pulse) which is then transmitted to the transmitter 202 via the communication ports 266. The multi-level encoder 328 may be a block configured to output a multi-level logic signal. In the specific case of a PON application, a logic low level indicates an upcoming high data rate burst, a mid-logic level may indicate an upcoming low data rate burst, and a high-logic level may indicate a host reset, and/or internally generated pulse train. The output of the burst event and pulse manager 318 may also be passed to the limiting amplifier signal recovery stage 302 (e.g., as a signal 320) and the signal conditioner 216 (e.g., as a signal 322). For example, in the case where the signal conditioner 216 is a CDR, the signal 322 may be used to allow data to be applied at the CDR's input stage only after the pulse 838 in FIG. 8A and pulse 891 in FIG. 8B have completed (i.e., the DC offset is removed by the signal recovery stage 302 prior to forwarding the signal to the CDR). It should also be noted that the widths of pulses 838 and 891 are programmable.

Figure 4A:
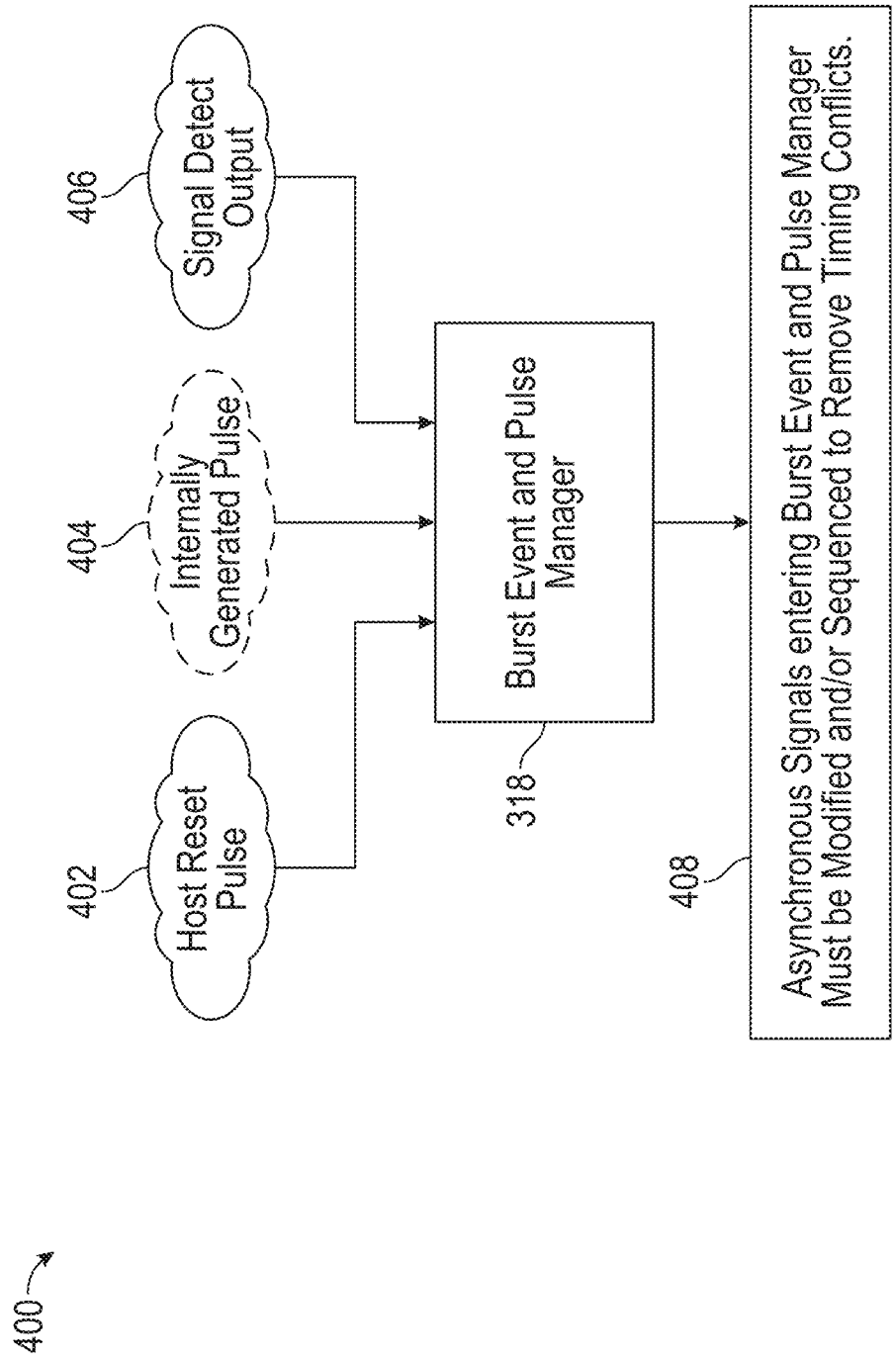
FIG. 4A shows a schematic diagram of an example of an architecture for handling asynchronous signals by the burst event and pulse manager.

FIG. 4A shows a schematic diagram of an example of an architecture 400 for handling asynchronous signals by the burst event and pulse manager 318. The asynchronous signals may include a host reset pulse 402 (e.g., a host reset signal from the host reset 230), an internally generated instruction 404 (e.g., a signal or a pulse generated by the pulse generator 326; 326S; or a pulse of 326S), and a signal detect output 406 (e.g., a signal generated by the on-chip signal detect circuit 220; 220S; or a pulse of 220S). The burst event and pulse manager 318 may modify and/or sequence the asynchronous signals to remove any potential timing conflicts between the signals (see the block 408). For example, when a host issues a reset signal when there is a start of transmission, during transmission, or end of a transmission, the internally generated instruction may be triggered asynchronously. The burst event and pulse manager 318 may delay a rising edge of a signal, delay a falling edge of the signal, delay (shorten or lengthen) the width of the signal, or extend the signal. In some aspects, delaying a rising/falling edge of a signal may include changing a rising/falling edge of the signal with respect to time (e.g., moving the rising/falling edge to an earlier time or to a later time).

Figure 4B:
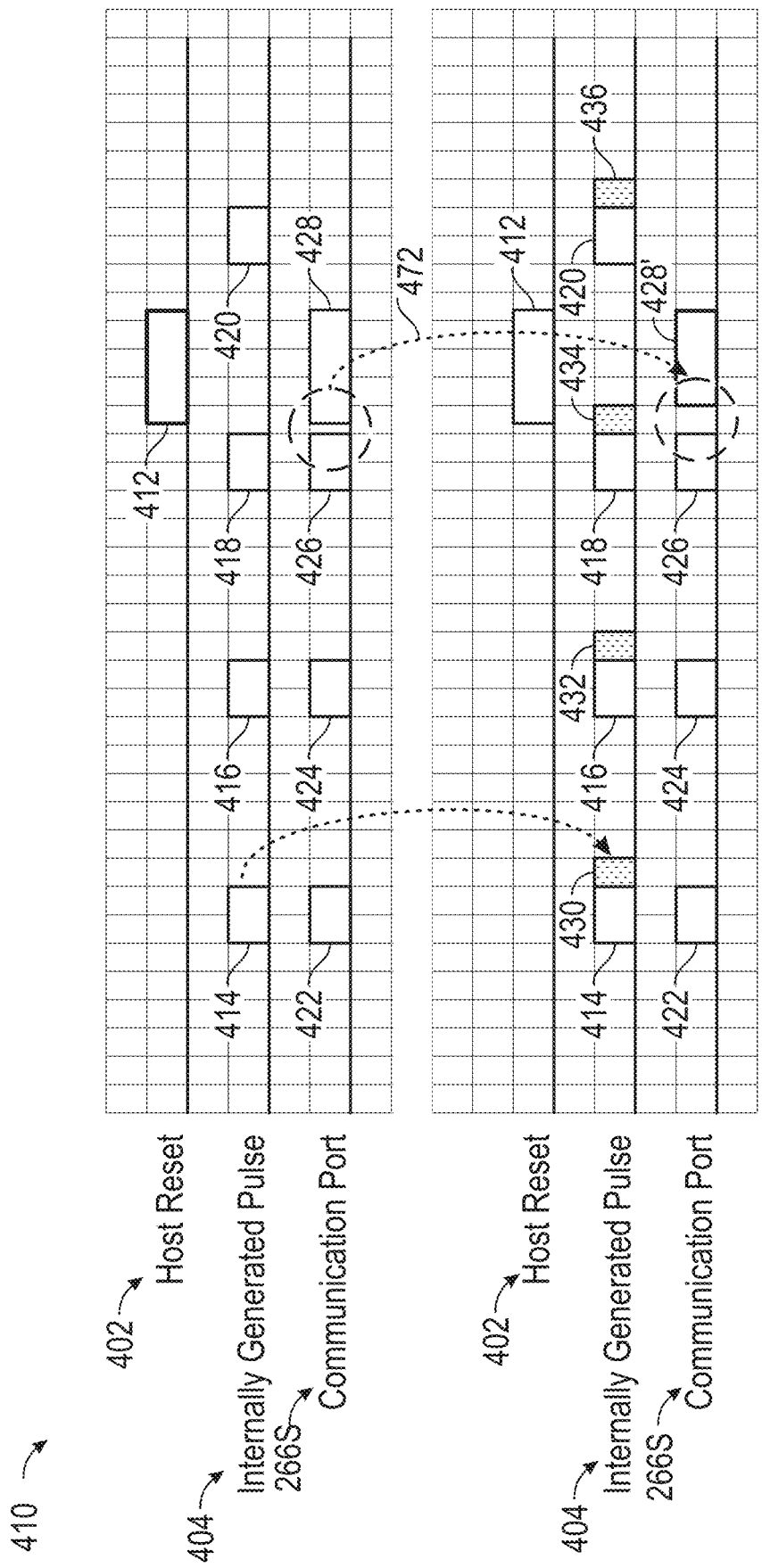
FIG. 4B shows a waveform diagram for an example scenario with a timing conflict.

FIG. 4B shows a waveform diagram for an example scenario 410 with a timing conflict. In this example, the host reset signal 402 includes a pulse 412, the internally generated instruction 404 includes pulses 414, 416, 418 and 420, and the communication port signal 266S includes pulses 422, 424, 426 and 428. The pulse 412 conflicts with (e.g., the signal is too close to) the internally generated instruction 418; hence, a specific portion of the front end of the pulse 428 (which is from the pulse 412) may be chopped, resulting in the pulse 428' (see a process 472). The burst event and pulse manager 318 may process the signals/pulses 402 and 404 (e.g., delaying, adjusting, shortening, or extending the pulses), to ensure that the signal output to the transmitter device, via the communication port 266, achieves a steady state level for a required period of time. For example, the burst event and pulse manager 318 may include an intentional gap between the pulses 426 and 428'. The nature of the gap may depend on whether the transmitter 202 requires a steady state low or a steady state high, and/or may be user programmable.

Figure 4C:
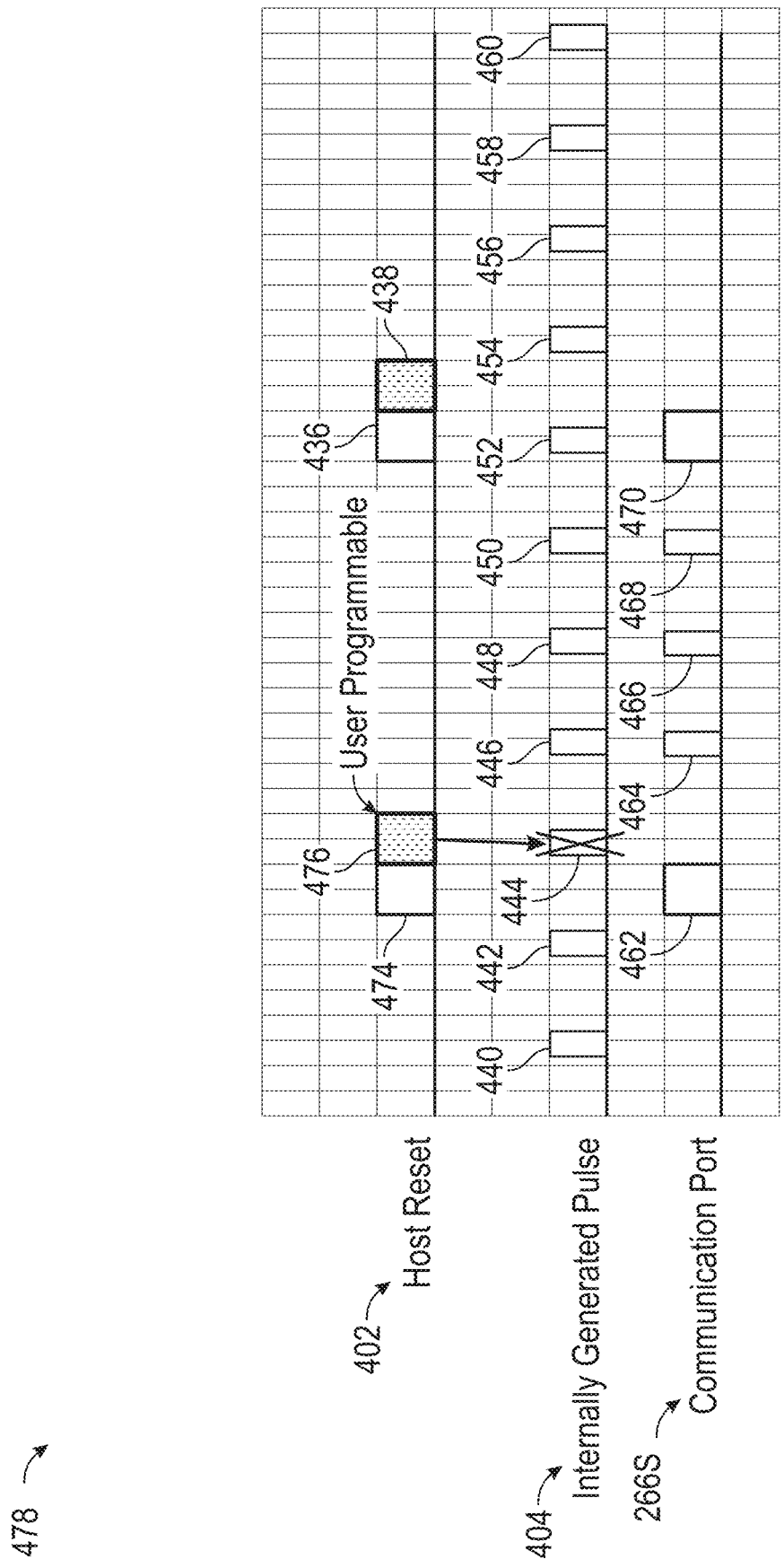
FIG. 4C shows a waveform diagram for another example scenario with a timing conflict.

FIG. 4C shows a waveform diagram for another example scenario 478 with a timing conflict. The internally generated instruction 404 includes pulses 440, 442, 444, 446, 448, 450, 452, 454, 456, 458, and 460. The host reset 402 includes pulses 474 and 436. The communication port 266 includes pulses 462, 464, 466, 468 and 470. The internally generated instruction 444 conflicts with (i.e., is too close to) the host reset pulse 474; hence, a specific portion of the front end of the pulse 444 may be chopped or all of the pulse 444 may be removed (e.g., the pulse 444 is completely removed as shown in FIG. 4C). To handle this situation, the burst event and pulse manager 318 may include intentional gaps 476 and 438 after the host reset pulses 432 and 436, respectively. The intentional gaps may be user programmable.

FIG. 5A is a waveform diagram for an example modification 500A of a host issued reset or an internally generated instruction by the burst event and pulse manager 318. A pulse 504 corresponds to a host reset 402 or the internally generated instruction 404. The burst event and pulse manager 318 may process (or modify) the pulse 504 to produce a processed pulse 526 for the receiver 204 and/or a processed pulse 528 for the transmitter 202. The burst event and pulse manager 318 may process (or modify) the pulse 504 by, for example, delaying a rising edge of the pulse 504, modifying (shortening or lengthening) the width of the pulse 504, delaying a falling edge of the pulse 504, delaying a rising edge of the processed pulse 526, or delaying a falling edge of the processed pulse 526. The burst event and pulse manager 318 may provide the processed pulse 526 to other components of the receiver 204 (e.g., the limiting amplifier signal recovery stage 302 and/or the signal conditioner 216). The burst event and pulse manager 318 may provide the processed pulse 528 to the pulse negotiation and communication management controller 210 of the transmitter 202 (e.g., via the multi-level encoder 328 and the communication ports 266).

The processed pulse 526 may include a portion 512, a portion 514, a portion 516, some combination thereof, or all portions thereof. In this example, the process pulse 526 may have a width 506 that may include a programmable delay versus a rising edge of the incoming pulse 504, a width 508 that may include a programmable width versus the incoming pulse 504, a width 510 that may include a programmable delay versus a falling edge of the incoming pulse 504, some combination thereof, or all of the widths thereof, respectively.

The processed pulse 528 may include a portion 520, a portion 512, a portion 514, a portion 516, a portion 518, some combination thereof, or all portions thereof. In this example, the processed pulse 528 may have a width 522 that may include a programmable delay versus a rising edge of the processed pulse 526 for the receiver 204, a width for the portion 512 (which is a width obtained by subtracting the width 522 from a width 506), a width 508 that may include a programmable width versus the incoming pulse 504, a width 510 that may include a programmable delay versus a falling edge of the incoming pulse 504, a width 524 that may include a programmable delay versus a falling edge of the processed pulse 526 for the receiver 204, some combination thereof, or all of the widths thereof, respectively. In this example for the processed pulse 528, the width 506 may include a programmable delay versus a rising edge of the incoming pulse 504.

Figure 5B:
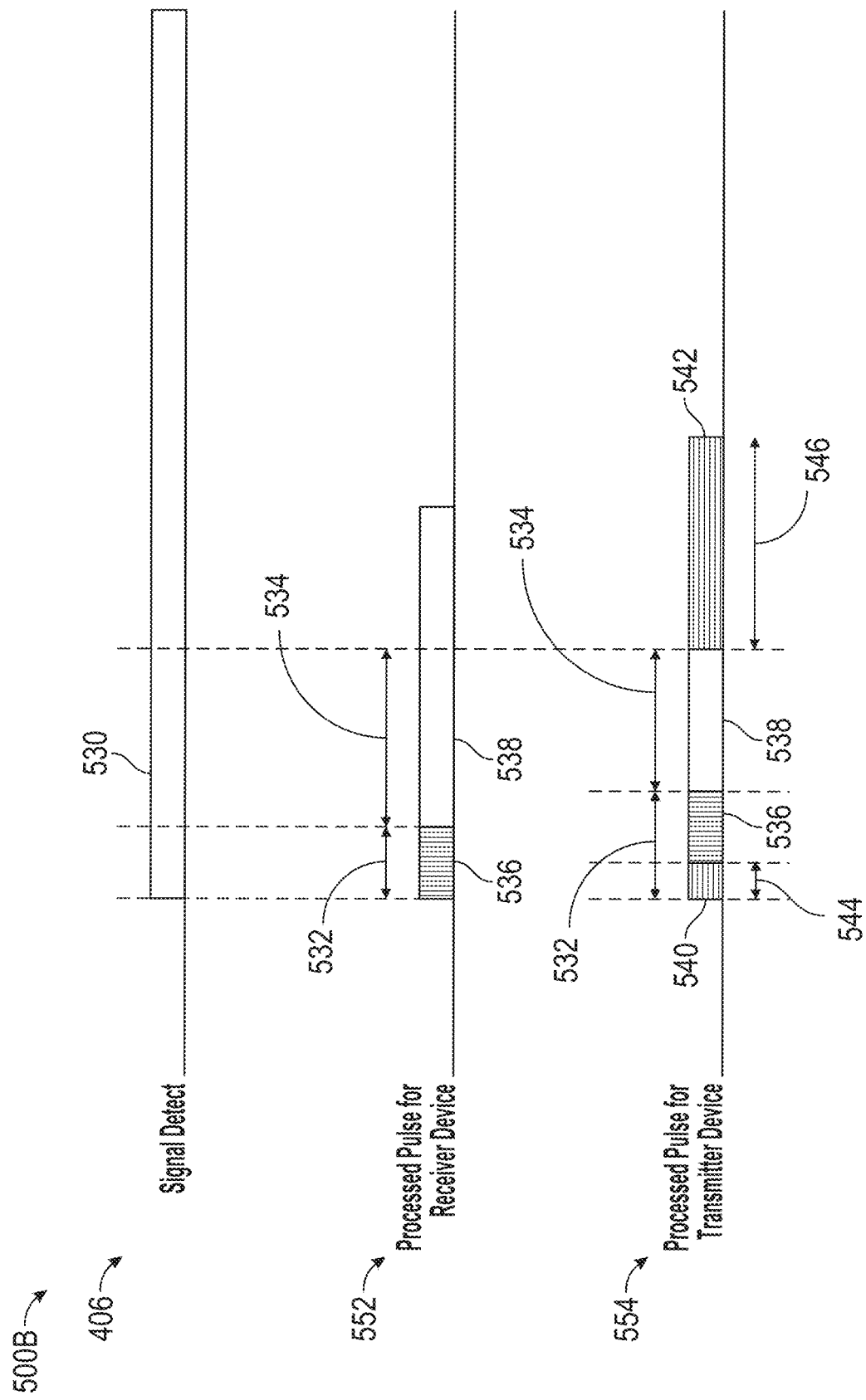
FIG. 5B is a waveform diagram for an example for utilization and manipulation of the output of the receiver's signal detect block by the burst event and pulse manager.

FIG. 5B is a waveform diagram for an example 500B for utilization and manipulation of the output of the receiver's signal detect circuit 220 by the burst event and pulse manager 318. When the signal detect circuit 220 of the receiver 204 detects a signal (e.g., 236 and 238) from the transmitter 202, the signal detect circuit 220 may generate a signal detect (or a signal detect signal) 406. The signal detect 406 may include a pulse 530. The burst event and pulse manager 318 may process the pulse 530 to generate a processed pulse 552 for the receiver 204 and/or a processed pulse 554 for the transmitter 202. The burst event and pulse manager 318 may provide the processed pulse 552 to other components of the receiver 204 (e.g., the limiting amplifier signal recovery stage 302 and/or the signal conditioner 216). The burst event and pulse manager 318 may provide the processed pulse 554 to the pulse negotiation and communication management controller 210 of the transmitter 202 (e.g., via the multi-level encoder 328 and the communication ports 266).

The processed pulse 552 may include a portion 536 having a width 532 that may include a programmable delay versus a rising edge of the incoming signal 530, a portion 538 having a width 534 that may include a programmable width, or some combination thereof. The processed pulse 554 may include a portion 540 having a width 544 that may include a programmable delay versus a rising edge of the processed receiver pulse 552, a portion 536 having a width obtained by subtracting the width 544 from a width 532, a portion 538 with a width 534 that may include a programmable width, a portion 542 having a width 546 that may include a programmable delay versus a falling edge of the processed receiver pulse 552, some combination thereof, or all of the portions thereof.

In connection with FIGS. 3, 5A and 5B and other figures, the processed pulses (e.g., 526 and/or 552) for the components of the receiver 204 may include the signals (e.g., 320 and/or 322 in FIG. 3, 838 in FIG. 8A, or 891 in FIG. 8B) generated and provided by the burst event and pulse manager 318 to the components of the receiver 204, such as the DC offset removal stage 212 (e.g., the limiting amplifier signal recovery stage 302) and/or the signal conditioner 216.

In connection with FIGS. 3, 5A and 5B and other figures, the processed pulses (e.g., 528 and/or 554) for the transmitter may include the signals (e.g., 310 in FIG. 3, or 266S in various figures) generated and provided by the burst event and pulse manager 318 to the components of the receiver 204 (e.g., the limiting amplifier signal recovery stage 302 and/or the signal conditioner 216).

Referring to FIGS. 4A to 5B, the burst event and pulse manager 318 may (i) delay and/or adjust a width of a host reset pulse 402 (e.g., 412 of FIG. 4B; 474 and 436 of FIG. 4C; 504 of FIG. 5A) relative to its proximity to an internally generated instruction 404 (e.g., 414, 416, 418, 420 of FIG. 4B; 440 to 460 in FIG. 4C; 504 of FIG. 5A), and/or (ii) delay and/or adjust a width of an internally generated instruction 404 relative to its proximity to a host reset pulse 402. The burst event and pulse manager 318 may be disposed within or outside the receiver 204. In some examples, if the burst event and pulse manager 318 is disposed outside the receiver 204, a receiver, a receiver device, or the like may include the receiver 204 (without 318) and another device (with 318).

Figure 6A:
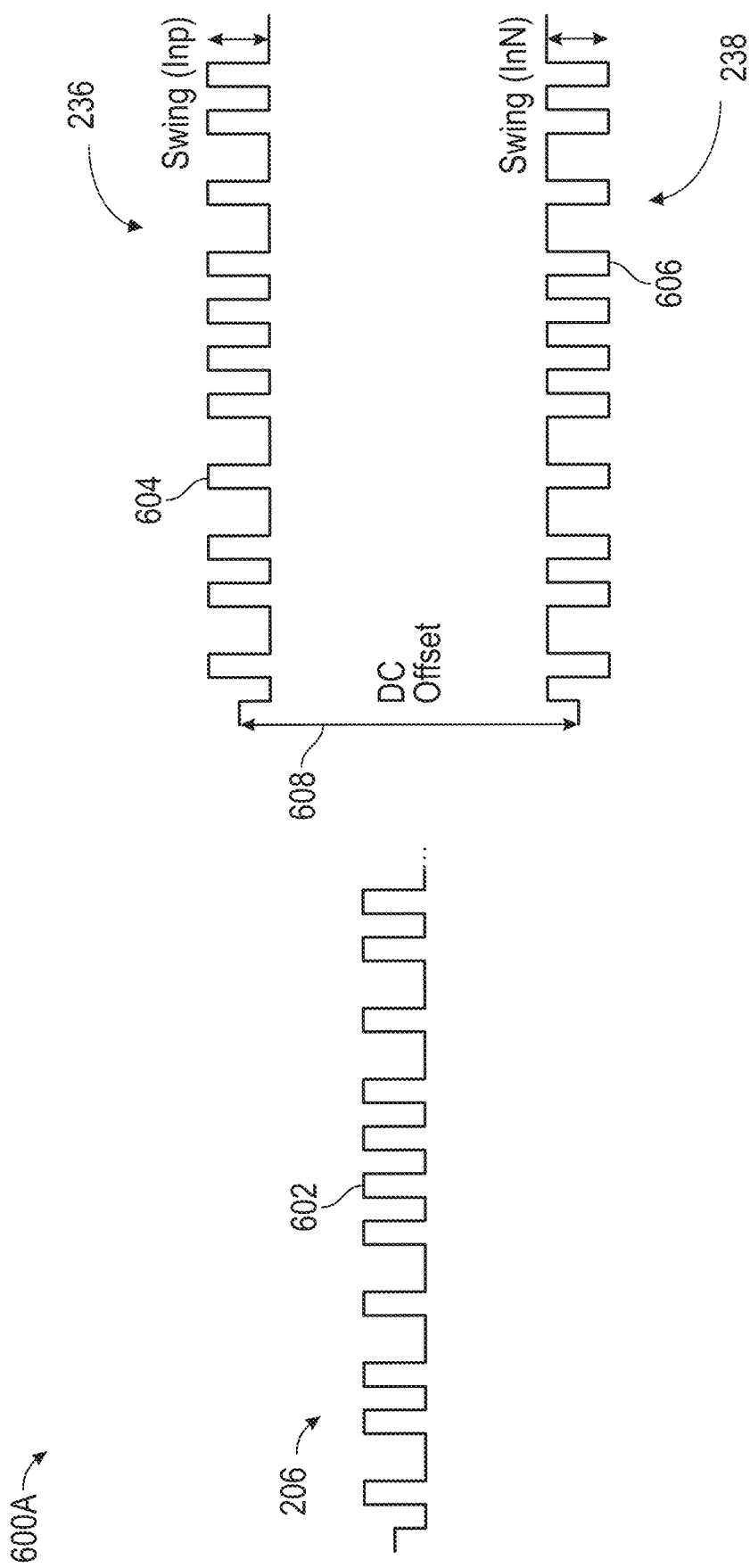
FIG. 6A shows example waveforms illustrating a DC offset.

FIG. 6A shows example waveforms 600A illustrating a DC offset. This example may illustrate a mission mode, where a host rest signal is provided. Waveform 602 may be an example of the burst mode input signal 206. Waveforms 604 and 606 may be examples of (i) the positive output signal 232 and the negative output signal 234, respectively, or (ii) the positive input signal 236 and the negative input signal 238, respectively. As shown in FIG. 6A, a DC offset 608 may refer to an offset or a difference (in DC) between the waveforms 604 and 606. In one or more aspects, a DC offset 608 may refer to a DC offset in amplitude or magnitude between the waveforms 604 and 606. In one or more examples, the DC offset is substantially larger than the swing (e.g., amplitude) of each of the waveforms 604 and 606. If the DC Offset less than the swing, then the impact could be excess jitter, decreased sensitivity, or bit errors output from the receiver device. If the DC Offset is greater than the swing, then the output signal may just appear toggled and prevent any portion of the incoming burst of data to be recovered. The notations "positive" and "negative" for the signals 232, 234 and 236 and 238 are relative terms, and they are not indicative of positive or negative numbers. In some examples, they may refer to two signals, where one is inverse of the other (e.g., when the waveform 604 is high, the waveform 606 is low, and vice versa; or when the waveform 604 is a non-inverted signal, the waveform 606 is an inverted signal, and vice versa).

In one or more examples, when a DC offset 608 is settled, the DC offset 608 is steady. A settled DC offset state may be understood in terms of the RC time constant (T) of the receiver device's input stage. A settled state may be quantified as being a change in voltage which occurs more than 5 times T, where T=RC. In one or more examples, when the waveforms 604 and 606 (e.g., output signals 232 and 234, or input signals 236 and 238) are settled, the swing of each of the waveforms 604 and 606 does not vary. An asymmetry between the positive and negative outputs of the transmitter could be considered a crossing point offset and an artifact which the receiver does not resolve. The foregoing provides examples, and the subject technology is not limited thereto.

Figure 6B:
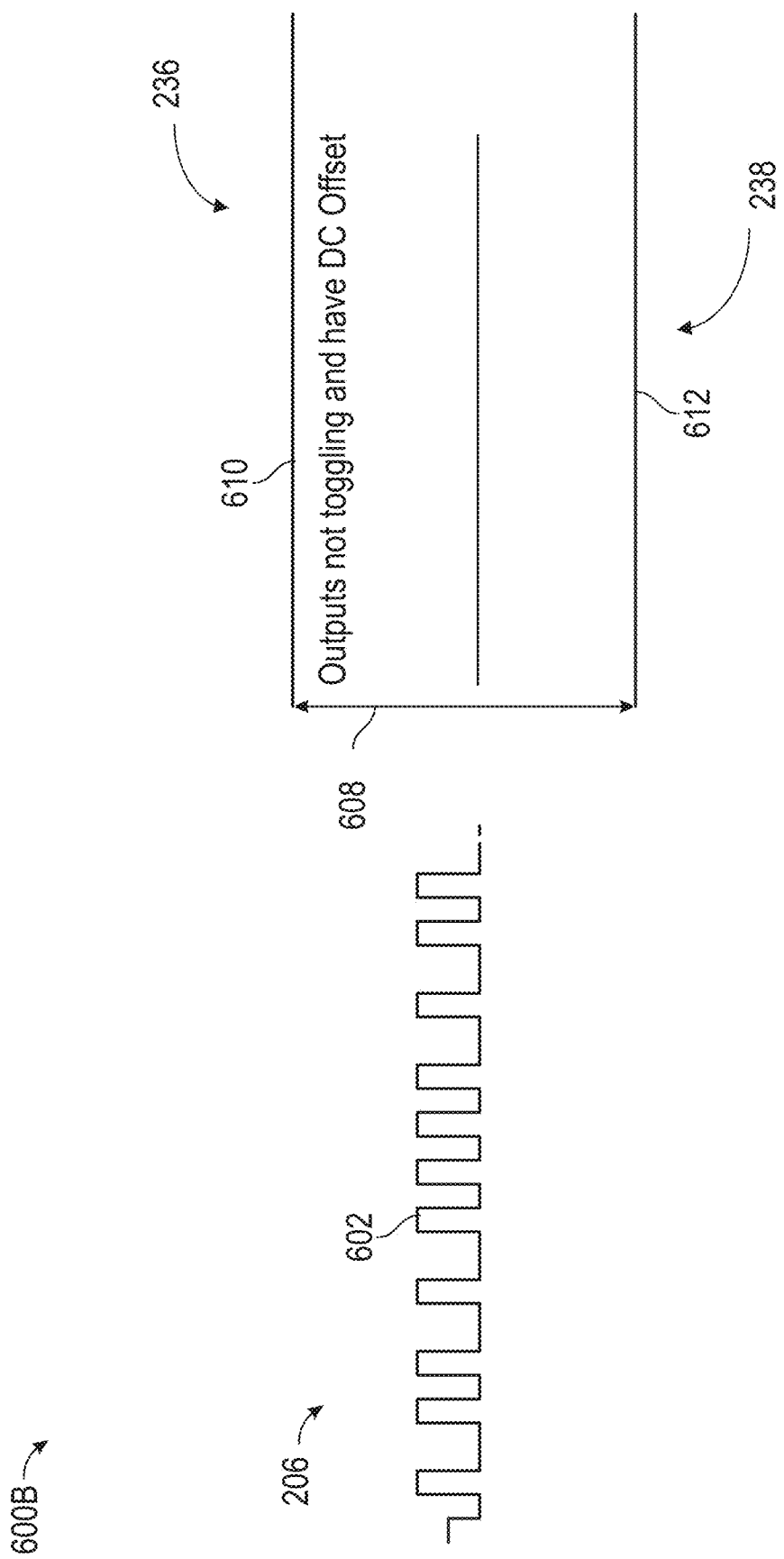
FIGS. 6B and 6C show example waveforms during a registration period, utilizing a signal conditioning and negotiation process.

FIG. 6B shows example waveforms 600B during a registration period, utilizing the signal conditioning and negotiation process. Waveform 602 may be an example of the burst mode input signal 206. Waveforms 610 and 612 may be examples of (i) the positive output signal 232 and the negative output signal 234, respectively, or (ii) the positive input signal 236 and the negative input signal 238, respectively. In this example, the waveforms 610 and 612 show no toggling. In other words, the waveforms are flat, showing no variation in the respective amplitude. However, there is a DC offset 608 between the waveforms 610 and 612.

Figure 6C:
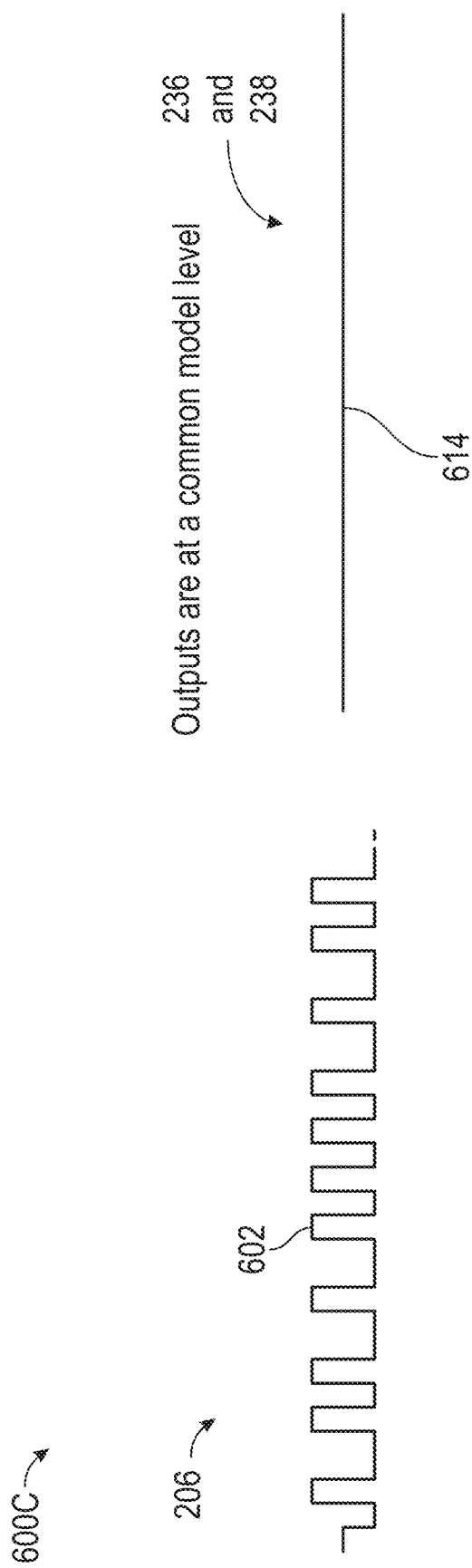

FIG. 6C shows other example waveforms 600C during a registration period, utilizing the signal conditioning and negotiation process. Outputs are at a common mode level. During this registration period, no host reset signal is provided. Waveform 602 may be an example of the burst mode input signal 206. Waveform 614 may be an example of (i) the positive output signal 232 and the negative output signal 234, respectively, or (ii) the positive input signal 236 and the negative input signal 238, respectively. In this example, the waveform 614 shows no toggling (e.g., no variation in amplitude) and is at a common mode (no DC offset).

A mission mode may be, for example, a normal operational mode (e.g., receiving, processing and/or sending information including user data). A registration mode (or period) is not a mission mode. A registration mode may be, for example, a mode (or period) in which the host is not aware and/or does not provide a signal (e.g., start of burst host reset) alerting the presence of a new burst of data.

Figure 7A:
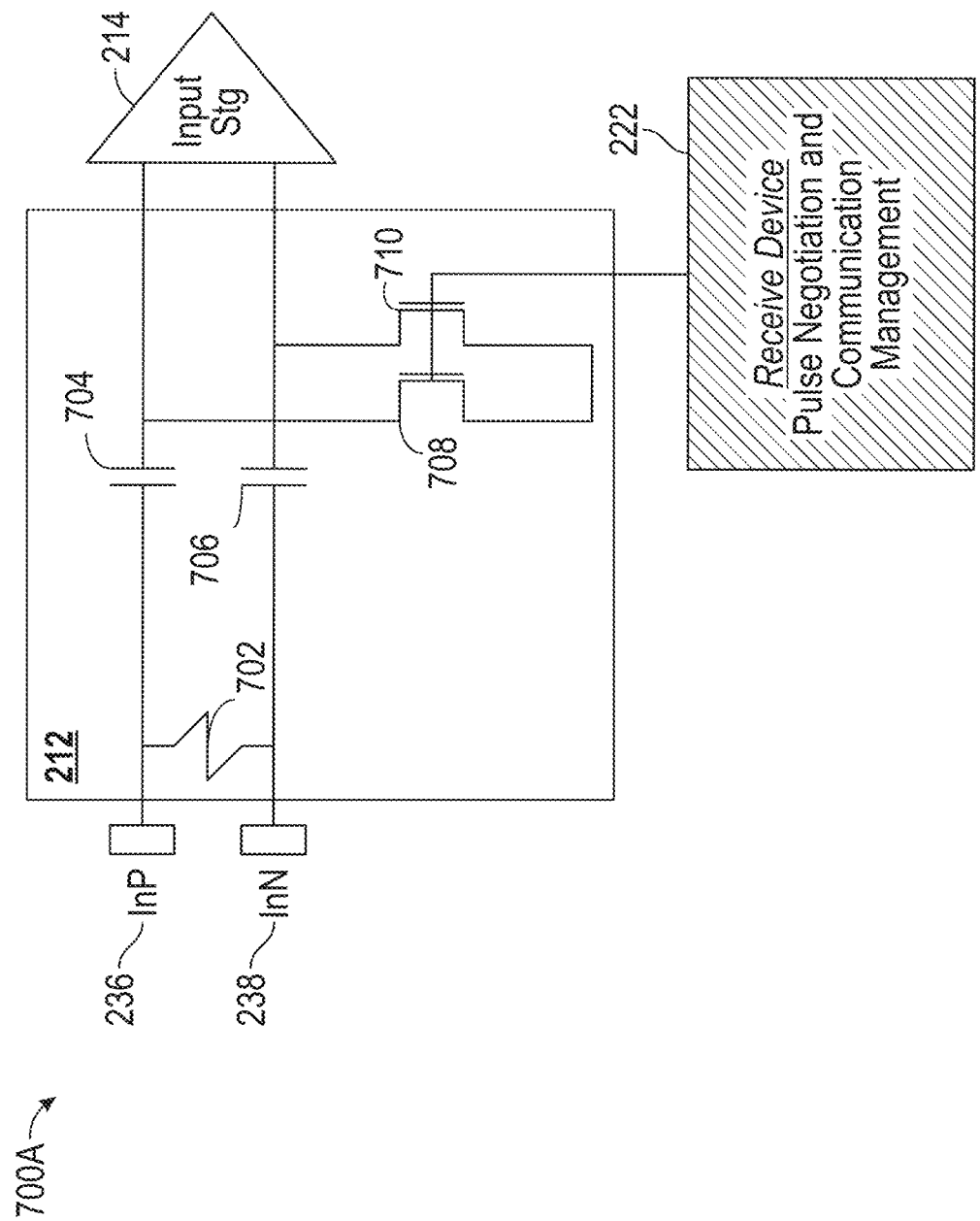
FIG. 7A is a block diagram of an example circuit including a DC offset removal stage.

FIG. 7A is a block diagram of an example circuit 700A including a DC offset removal stage 212. The DC offset removal stage 212 may include a resistor (or a termination resistor) 702, AC coupling capacitors 704 and 706, and switches 708 and 710. Each of the switches 708 and 710 may be one or more transistors. A transistor may be a metal oxide semiconductor field effect transistors (MOSFET) and/or a bipolar junction transistor (BJT).

The termination resistor 702 may be connected in parallel to the positive input 236 and the negative input 238. The AC coupling capacitor 704 may connect the positive input 236 to a first input of the input stage 214, and another AC coupling capacitor 706 may connect the negative input 238 to a second input of the input stage 214. Switches 708 and 710 may be coupled to the capacitors 704 and 706 and to the inputs of the input stage 214, respectively. The switches 708 and 710 may be used to short the AC coupling capacitors 704 and 706 and remove a DC offset on (or at) the input stage of the AC coupling capacitors 704 and 706. It should be noted that the example circuits described herein are for illustration. There may be other methods of connecting the transmitter outputs to the receiver inputs, including by component placement external to the devices.

In one or more examples, when the pulse negotiation and communication management controller 222 provides a trigger signal to the DC offset removal stage 212, the DC offset removal stage 212 may perform a DC offset removal process. For example, when the pulse negotiation and communication management controller 222 provides a trigger signal (e.g., a trigger pulse 838 in FIG. 8A) to the switches 708 and 710, the switches 708 and 710 may short the AC coupling capacitors 704 and 706. This shorting may thus discharge the AC coupling capacitors 704 and 706 and remove a DC offset (e.g., the DC offset 608 shown in FIG. 6A) present between the input signals 236 and 238.

Figure 7B:
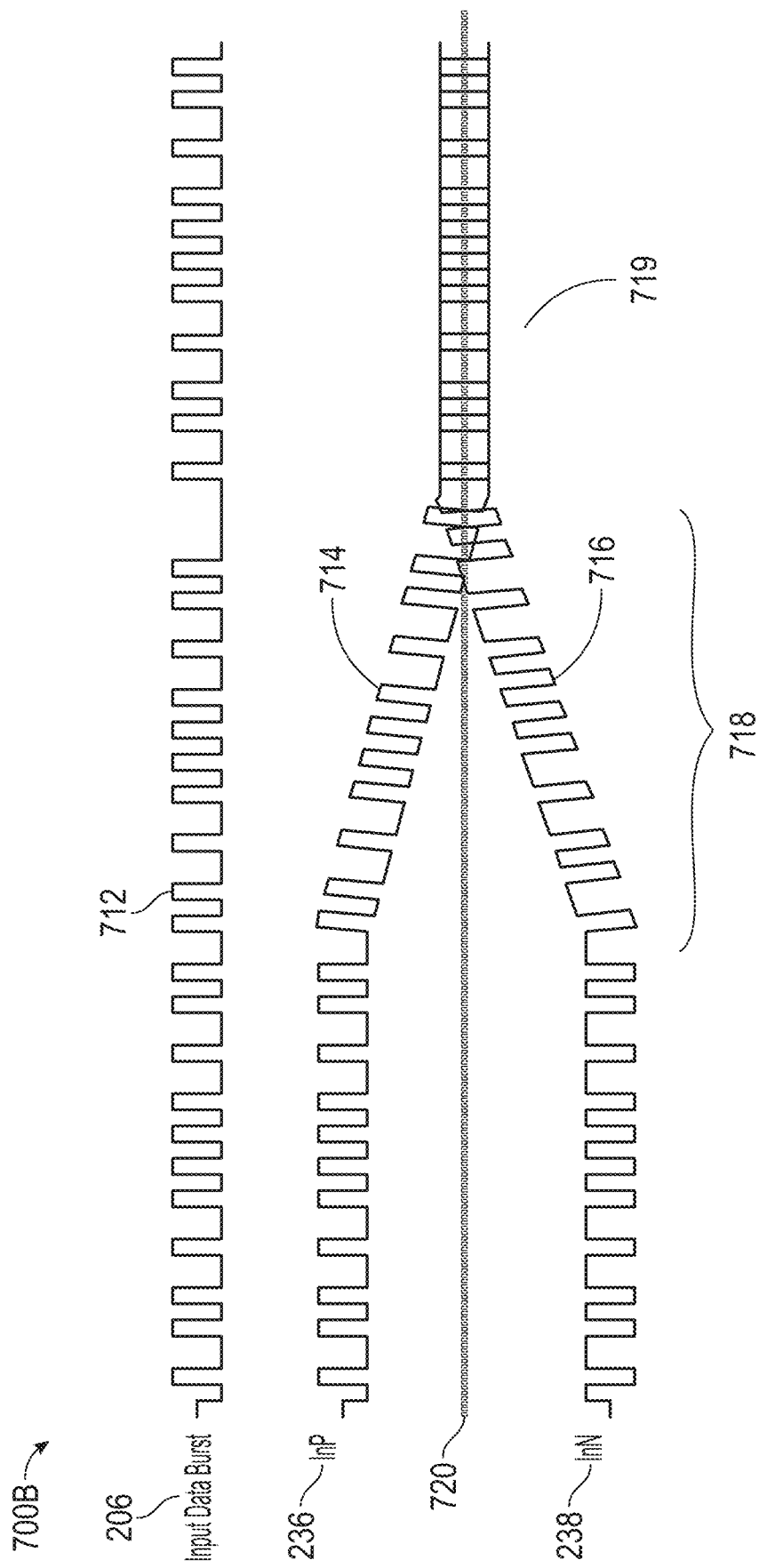
FIG. 7B shows example waveforms for the DC offset removal stage.

FIG. 7B shows example waveforms 700B for the DC offset removal stage 212. The input data burst 206 may include burst data signal or burst data pattern signal 712. The positive input 236 and the negative input 238 may include data signals 714 and 716, respectively.

Referring to FIGS. 7A and 7B, when the pulse negotiation and communication management controller 222 provides a trigger signal to the switches 708 and 710, the switches 708 and 710 may short (or discharge) the AC coupling capacitors 704 and 706 and remove all or part of the DC offset between the data signals 714 and 716, as illustrated by a process 718. Once the DC offset is removed, the data signals 714 and 716 have no DC offset between them (see the region indicated by the arrow 719).

FIG. 8A shows waveforms for an example communication scheme 800A during a registration mode.

Referring to the foregoing figures such as FIGS. 2A-2I, 3, 7A and 8A, the input 206 may include a data burst 802 followed by a registration mode data burst 804. The transmitter 202 may generate its output signals 232 and 234 that include a signal 806 followed by a signal 808. The host reset signal 230 received from a host may include a host reset pulse 810. This host reset pulse 810, however, is issued prior to entering into the registration mode. During the registration mode (e.g., a time period after receiving the registration mode data burst 804), a host reset pulse is not issued by the host. A registration mode data burst can be described as a data burst sent to the transmitter device without the presence of a start of burst reset. This start of burst reset is what differentiates a registration mode data burst and a mission mode data burst. The signal detect circuit 220 may generate a signal detect 220S that includes an assertion signal 812 followed by an assertion signal 814. An assertion signal may be sometimes referred to as an assertion pulse, a signal detect signal, or a signal detect circuit's assert signal.

Based on the assertion signal 812, the burst event and pulse manager 318 may generate and provide a capacitor discharge pulse 320 that may include a pulse 838. The pulse generator 326 may generate internally generated instructions 326S that include pulses 816, 818, 820, 822, 824, 826, 828, 830, 832, 834 and/or 836. The burst event and pulse manager 318 may generate and cause providing to the communication ports 266 one or more reset pulses (e.g., 840, 842 844, 846, 848 and/or 850) based on the internally generated instructions 326S (e.g., 822, 824, 826, 828, 830 and/or 832) and/or host-issued reset pulses (e.g., 810). Each of the communication ports 266 may receive/provide a communication port signal 266S that includes pulses (or result pulses) 839, 840, 842 844, 846, 848 and/or 850. The communication ports 266 may send these pulses to the pulse negotiation and communication management controller 210 of the transmitter 202.

The pulse negotiation and communication management controller 210 may decode and process one or more pulses received from the communication ports 266 (e.g., 840, 842 844, 846, 848 and/or 850) and provide one or more reset pulses (based on the one or more received pulses) and/or communication signaling scheme internal to the transmitter device, to the amplifier and/or signal conditioner 208. In this way, when the amplifier and/or signal conditioner 208 receives an input signal 206 (e.g., a burst of data 804), the amplifier and/or signal conditioner 208 is ready to convert the input signal to the output signals 232 and 234 (e.g., a signal 808) based on the reset pulse provided by the pulse negotiation and communication management controller 210. Sending pulses from the receiver 204 to the transmitter 202 through port 266 may keep the transmitter 202 in a periodic alert state so that when a new burst of data appears at its input 206 in registration mode (i.e., no host issued start of burst reset), the block 208 can behave in the same or similar way as if the host would have issued a start of burst reset (e.g., mission mode).

The receiver 204 (e.g., the output stage 218) may generate an output signal 226 (e.g., 224 and 228) that includes a data burst 852 followed by a gap 854 and valid data 856.

Example processes in connection with the arrows labeled (1), (2), (3) and (4) in FIG. 8A are described below.

A first example process in connection with the arrow labeled (1) in FIG. 8A may include the following: When the signal detect circuit 220 de-asserts (e.g., stops the assertion signal 812), a self-generated train of reset pulses (e.g., 840, 842, 844, 846, and/or 848), is sent through the communication ports 266.

The aforementioned first example process involving the arrow labeled (1) may be described in more detail as below. In one or more examples, when the signal detect circuit 220 stops providing its assertion signal 812 to the burst event and pulse manager 318, the burst event and pulse manager 318 may process (or modify) one or more of the internally generated instruction 326S (e.g., 822, 824, 826, 828, and/or 830) and provide the one or more processed pulses to the multi-level encoder 328. The multi-level encoder 328 may encode the one or more processed pulses and provide the one or more encoded pulses as the self-generated train of reset pulses (e.g., 840, 842, 844, 846, and/or 848) to the communication port 266 of the receiver 204. The communication port 266 of the receiver 204 may provide the one or more encoded pulses as the self-generated train of reset pulses (e.g., 840, 842, 844, 846, and/or 848) to the pulse negotiation and communication management controller 210 of the transmitter 202 via the communication port 266 of the transmitter 202.

Second and third example processes in connection with the arrows labeled (2) and (3) in FIG. 8A may include the following: A new burst of data 804 (which is the registration mode data burst) may appear shortly before a self-generated pulse 848 is sent to the transmitter 202. This causes the transmitter 202 to begin outputting a valid electrical signal 808 with sufficient amplitude to trigger the signal detect circuit 220 to assert its assertion pulse 814. (See the arrow labeled (2)) To ensure that an optimal gain setting of the transmitter 202 is achieved, one or more pulses (e.g., a pulse 850) may be sent to the transmitter 202 after the signal detect circuit 220 generates the assertion signal 814. (See the arrow labeled (3))

The aforementioned second and third processes involving the arrows labeled (2) and (3) may be described in more detail as below. In one or more examples, the transmitter 202 may receive the new burst of data 804 as an input 206. This may occur before the pulse negotiation and communication management controller 222 sends the self-generated pulse 848 to the pulse negotiation and communication management controller 210 via the communication ports 266 (as illustrated above as part of the process involving the arrow labeled (1)). The self-generated pulse 848 may be generated by the burst event and pulse manager 318 and the multi-level encoder 328 in that the burst event and pulse manager 318 may process (or modify) one or more of the internally generated instructions 326S (e.g., the pulse 830) and provide one or more processed pulses to the multi-level encoder 328. The multi-level encoder 328 may encode the one or more processed pulses and provide the one or more encoded pulses (e.g., as the self-generated pulse 848) to the communication port 266 of the receiver 204. The communication port 266 of the receiver 204 may provide the one or more encoded pulses (e.g., the pulse 848) to the pulse negotiation and communication management controller 210 of the transmitter 202 via the communication port 266 of the transmitter 202. The pulse negotiation and communication management controller 210 may decode and process one or more pulses received from the communication ports 266 (e.g., the pulse 848) and provide one or more pulses (e.g., a pulse based on the pulse 848) to the amplifier and/or signal conditioner 208.

The amplifier and/or signal conditioner 208 of the transmitter 202 may process the burst of data 804 using the one or more pulses (e.g., a pulse based on the pulse 848) and output the valid electrical signal 808 as output signals 232 and 234 with sufficient amplitude. When the signal detect circuit 220 detects the signal 808, the signal detect circuit 220 may generate the assertion pulse 814 and provide the assertion pulse 814 to the burst event and pulse manager 318. The burst event and pulse manager 318 may then process (or modify) one or more of the internally generated instructions 326S (e.g., the pulse 832) and provide one or more processed pulses to the multi-level encoder 328. The multi-level encoder 328 may encode the one or more processed pulses and provide the one or more encoded pulses (e.g., the pulse 850) to the communication port 266 of the receiver 204. The communication port 266 of the receiver 204 may provide the one or more encoded pulses (e.g., the pulse 850) to the pulse negotiation and communication management controller 210 of the transmitter 202 via the communication port 266 of the transmitter 202. The pulse negotiation and communication management controller 210 may decode and process one or more pulses received from the communication ports 266 (e.g., the pulse 850) and provide one or more pulses (e.g., one or more pulses based on the pulse 850) to the amplifier and/or signal conditioner 208 so that the transmitter 202 may, for example, provide an optimal gain setting for its input signal 206.

A fourth example process in connection with the arrow labeled (4) in FIG. 8A may include the following: A pulse 838 may be sent to discharge the on-chip AC coupling capacitors after the last reset pulse 850 is sent to the transmitter 202.

The aforementioned fourth process involving the arrow labeled (4) may be described in more detail as below. When the signal detect circuit 220 detects the signal 808 and provides the assertion pulse 814 to the burst event and pulse manager 318 (as illustrated above as a part of the process involving the arrow labeled (3)), the burst event and pulse manager 318 may generate a trigger pulse 838 and provide the trigger pulse 838 to the switches 708 and 710 of the DC offset removal stage 212 (or the limiting amplifier signal recovery stage 302). The switches 708 and 710 may then discharge (or short) the AC coupling capacitors 704 and 706. As a result, a DC offset (e.g., the DC offset 608 shown in FIG. 6A) between the input signals 236 and 238 is removed, and the signal provided to the input stage 214 (e.g., signals 714 and 716 in the region indicated by the arrow 719) does not contain a DC offset. In this example, the burst event and pulse manager 318 may provide the trigger pulse 838 to the switches 708 and 710 after the reset pulse 850 is sent to the pulse negotiation and communication management controller 210 of the transmitter 202, as illustrated above as a part of the process involving the arrow labeled (3).

Referring to FIG. 8A, some of the internally generated instructions 326S (e.g., pulses 816, 818, 834 and 836) are marked with the notation X. In this example, the pulses marked with the notation X are not utilized in that while the pulse generator 326 generates these pulses (e.g., pulses 816, 818, 834 and 836), the burst event and pulse manager 318 does not process (or modify or use) these pulses in generating pulses to provide to the transmitter 202 or to the components (e.g., 302 or 216) of the receiver 204.

As described in connection with FIG. 8A, during a registration mode, the pulse negotiation and communication management controller 222 (e.g., the burst event and pulse manager 318) may generate and cause providing one or more reset pulses (e.g., 840, 842 844, 846, 848 and/or 850) to the transmitter 202 by processing one or more internally generated instructions 326S (e.g., 822, 824, 826, 828, 830, and/or 832) based on the signal detect signal 220S (e.g., assertion pulses 812 and/or 814) without receiving or using a host reset signal from a host. Furthermore, during the registration mode, the pulse negotiation and communication management controller 222 (e.g., the burst event and pulse manager 318) may generate a trigger signal (e.g., a trigger pulse 838) based on the signal detect signal 220S (e.g., an assertion pulse 814) to remove a DC offset of the input signals 236 and 238.

FIG. 8B shows waveforms for an example communication scheme 800B during a mission mode.

Referring to the foregoing figures such as FIGS. 2A-2I, 3, 7A and 8B, the input 206 may include a data burst 858 followed by another data burst 860. The data burst 860 is a mission mode data burst because of the presence of the start of burst host issued reset pulse 868. There are no registration mode data bursts. The transmitter 202 may generate its output signals 232 and 234 that include a signal 862 followed by a signal 864. The host signal decoder 316 may receive from a host the host reset signal 230 that may include a host reset pulse 866 followed by a host reset pulse 868. The signal detect circuit 220 may generate a signal detect 220S that includes an assertion signal 870 followed by an assertion signal 872. An assertion signal may be sometimes referred to as an assertion pulse, a signal detect signal, or a signal detect circuit's assert signal.

Based on the assertion signal 872, the burst event and pulse manager 318 may generate and provide a capacitor discharge pulse 320 that may include a pulse 891. The pulse generator 326 may generate internally generated instructions 326S that include pulses 874, 876, 878, 880, 882, 884, 886, 888, 890 and/or 892. The burst event and pulse manager 318 may generate and cause providing to the communication ports 266 (i) one or more pulses (e.g., 894, 896, 898 and/or 881) based on the internally generated instructions 326S (e.g., 880, 882, 884, and/or 886) as well as (ii) one or more reset pulses (e.g., 879 and/or 883) based on one or more host reset pulses (e.g., 866 and/or 868). Each of the communication ports 266 may receive/provide a communication port signal 266S that includes result pulses 879, 894, 896, 898, 881 and/or 883. The communication ports 266 may send these reset pulses to the pulse negotiation and communication management controller 210 of the transmitter 202.

The pulse negotiation and communication management controller 210 may decode and process one or more reset pulses received from the communication ports 266 (e.g., 879, 894, 896, 898, 881 and/or 883) and provide one or more reset pulses (based on one or more of the received reset pulses) to the amplifier and/or signal conditioner 208 so that when the amplifier and/or signal conditioner 208 receives an input signal 206 (e.g., a burst of data 860), the amplifier and/or signal conditioner 208 is ready to convert and process the input signal to the output signals 232 and 234 (e.g., a signal 864) based on the reset pulse provided by the pulse negotiation and communication management controller 210. For example, if the transmitter 202 receives a new burst of data shortly before receiving a reset pulse from the receiver 204, the transmitter 202 may generate its output of the new burst of data based on this reset pulse. This reset pulse may have been generated by the burst event and pulse manager 318 based on (i) an internally generated instruction (e.g., 894, 896, 898 or 881) or (ii) a host reset signal (e.g., 868).

The receiver 204 (e.g., the output stage 218) may generate an output signal 226 (e.g., 224 and 228) that includes a data burst 885 followed by a gap 887 and valid data 889.

Example processes in connection with the arrows labeled (1), (2), and (3) in FIG. 8B are described below.

A first example process in connection with the arrow labeled (1) in FIG. 8B may include the following: when the signal detect circuit 220 de-asserts (e.g., 870), which indicates a loss of signal or no signal status, a self-generated train of reset pulses (e.g., 894, 896, 898, and/or 881), is sent through the communication ports 266. It should be noted that the time after the falling edge of 870 and/or 879 to the time when the internally generated pulses are allowed to pass through the communication port, may be programmable.

The aforementioned first example process involving the arrow labeled (1) may be described in more detail as below. In one or more examples, when the signal detect circuit 220 stops providing its assertion signal 870 to the burst event and pulse manager 318, the burst event and pulse manager 318 may process (or modify) one or more of the internally generated instructions 326S (e.g., 880, 882, 884, 886, and/or 888) and provide the one or more processed pulses to the multi-level encoder 328. The multi-level encoder 328 may encode the one or more processed pulses and provide the one or more encoded pulses as the self-generated train of reset pulses (e.g., 894, 896, 898, and/or 881) to the communication port 266 of the receiver 204. The communication port 266 of the receiver 204 may provide the one or more encoded pulses as the self-generated train of reset pulses (e.g., 894, 896, 898, and/or 881) to the pulse negotiation and communication management controller 210 of the transmitter 202 via the communication port 266 of the transmitter 202.

The pulse negotiation and communication management controller 210 may decode and process one or more pulses received from the communication ports 266 (e.g., 894, 896, 898, and/or 881) and provide one or more reset pulses (based on one or more of the received pulses) to the amplifier and/or signal conditioner 208 so that if the amplifier and/or signal conditioner 208 receives a new burst of data as the input signal 206, the amplifier and/or signal conditioner 208 will be ready to convert the input signal to the output signals 232 and 234 based on the reset pulse provided by the pulse negotiation and communication management controller 210. In this example, however, since there is no new burst of data received during this time period (T1), these reset pulses (e.g., 894, 896, 898, and/or 881) are not used by the amplifier and/or signal conditioner 208 to convert the input signal to the output signals 232 and 234. When the transmitter receives a pulse via the communication port, it assumes a new data burst is present or is about to appear and re-configures itself into a ready state to set its input signal conditioning features (e.g., gain, offset control, bandwidth setting) for a specific but relatively short period of time (this period of time could vary depending on the application and/or transmitter design). When no data is present (e.g., T1), each time the transmitter receives a pulse, it may reconfigure itself and attempt to adjust its signal conditioning features. But with no data present, its outputs will remain unmodified. This in turn leaves the receiver's signal detect de-asserted, and which, in turn, causes the receiver to continue to output burst not present mode signaling 242 via the communication port. This will continue happening until a new data burst actually appears which will prompt the transmitter to begin toggling its outputs which will cause the receiver's signal detect block to assert a signal is present.

Second and third example processes in connection with the arrows labeled (2) and (3) in FIG. 8B may include the following: A new burst of data 860 may appear shortly before a host reset pulse 868 is received (or issued). This host reset signal 868 is forwarded as a reset pulse 883 (see the arrow labeled (2)) to the transmitter 202 through the communication ports 266. The signal detect circuit 220 may issue an assertion pulse (or a signal detect pulse) 872 after a falling edge of the host reset pulse 868 when the transmitter 202's output signals 232 and 234 are settled. The assertion pulse 872 may be subsequently internally used and cause a pulse 891 (see the arrow labeled (3)) to discharge the on-chip AC coupling capacitors 704 and 706. In the mission mode, no self-generated pulse (e.g., the pulses marked with the notation X, such as the pulses 874, 876, 890, 892 and 893) may be allowed to be output (e.g., to the transmitter 202) while the signal detect signal 220S is asserted (e.g., during the time periods the assertion pulses 870 and 872 are present).

The aforementioned second and third processes involving the arrows labeled (2) and (3) may be described in more detail as below. In one or more examples, the transmitter 202 may receive the new burst of data 860 as an input 206. This may occur before the host signal decoder 316 receives the host reset pulse 868 from the host. When the host signal decoder 316 receives the host reset pulse 868, the host signal decoder 316 provides the host reset pulse 868 to the burst event and pulse manager 318. The burst event and pulse manager 318 may select and process (or modify) the host reset pulse 868 instead of an internally generated instruction 326S. The burst event and pulse manager 318 may provide the processed pulse to the multi-level encoder 328. The multi-level encoder 328 may encode the processed pulse and provide the encoded pulse (e.g., the host reset pulse 883) to the communication port 266 of the receiver 204. (See the arrow labeled (2)). The communication port 266 of the receiver 204 may provide the pulse (e.g., the pulse 883) to the pulse negotiation and communication management controller 210 of the transmitter 202 via the communication port 266 of the transmitter 202. The pulse negotiation and communication management controller 210 may decode and process the pulse received from the communication ports 266 (e.g., the pulse 883) and provide a signal (e.g., a pulse based on the pulse 883) to the amplifier and/or signal conditioner 208.

The amplifier and/or signal conditioner 208 of the transmitter 202 may process the burst of data 860 using one or more pulses (e.g., a pulse based on the pulse 883) and output the valid electrical signal 864 as output signals 232 and 234 with sufficient amplitude. The signal detect circuit 220 may issue an assertion pulse 872 after a falling edge of the host reset pulse 868 when the transmitter 202's output signals 232 and 234 are settled, and the signal detect circuit 220 detects the signal 864. The signal detect circuit 220 may then provide the assertion pulse 872 to the burst event and pulse manager 318. Based on the assertion pulse 872, the burst event and pulse manager 318 may generate and provide the trigger pulse 891 (see the arrow labeled (3)) to the switches 708 and 710 of the DC offset removal stage 212 (or the limiting amplifier signal recovery stage 302). The switches 708 and 710 may then discharge (or short) the AC coupling capacitors 704 and 706. As a result, a DC offset (e.g., the DC offset 608 shown in FIG. 6A) between the input signals 236 and 238 is removed, and the signal provided to the input stage 214 (e.g., signals 714 and 716 in the region indicated by the arrow 719) does not contain a DC offset. In this example, the burst event and pulse manager 318 may provide the trigger pulse 891 to the switches 708 and 710 after the reset pulse 883 is sent to the pulse negotiation and communication management controller 210 of the transmitter 202.

As described in connection with FIG. 8B, during a mission mode, the pulse negotiation and communication management controller 222 (e.g., the burst event and pulse manager 318) may generate and cause providing one or more reset pulses (e.g., 883) to the transmitter 202 by selecting and processing (or based on) a host reset signal 230 (e.g., the host reset pulse 868). The transmitter 202 may then generate its output signal (e.g., 864) based on a reset pulse (e.g., 883). Furthermore, during the mission mode, the pulse negotiation and communication management controller 222 (e.g., the burst event and pulse manager 318) may generate a trigger signal (e.g., a trigger pulse 891) based on the signal detect signal 220S (e.g., an assertion pulse 872) to remove a DC offset of the input signals 236 and 238.

While not illustrated in FIG. 8B, during a mission mode, if the transmitter 202 receives another burst of data as an input 206 shortly before the transmitter 202 receives a reset pulse (e.g., 894, 896, 898, or 881) generated based on an internally generated instruction 326S (e.g., 880, 882, 884, or 886), the amplifier and/or signal conditioner 208 of the transmitter 202 may produce its output (as output signals 232 and 234) based on the another burst of data using a pulse based on the recently received reset pulse (e.g., 894, 896, 898, or 881). Furthermore, during the mission mode, if the signal detect circuit 220 detects this output from the transmitter 202 and sends an assertion pulse (as a signal detect signal 220S) to the burst event and pulse manager 318, the burst event and pulse manager 318 may generate a trigger signal based on this assertion pulse to discharge the AC coupling capacitors 704 and 706 and remove a DC offset of the input signals 236 and 238.

Referring to FIGS. 2I, 8A and 8B, in one or more aspects, the burst present mode signaling 276 of FIG. 2I may correspond to a signaling mode M1 of FIGS. 8A and 8B. The burst not-present mode signaling 242 of FIG. 2I may correspond to a signaling mode M2 of FIGS. 8A and 8B.

In some aspects, the subject technology may be used in any application involving data which arrives in bursts rather than in a continuous fashion. For example, the subject technology may be used in a 10 gigabit-capable passive optical network (XG-PON) system that provides high speed data communications, over a fiber optical cable. The subject technology, however, is not limited to this network system, and it may be utilized in other PON systems, such as a gigabit PON (GPON), an Ethernet PON (EPON), a 10 gigabit symmetrical PON (XGS-PON), and an HSPON. A PON may be provided, for example, between an internet service provider (ISP) and end users.

Figure 9:
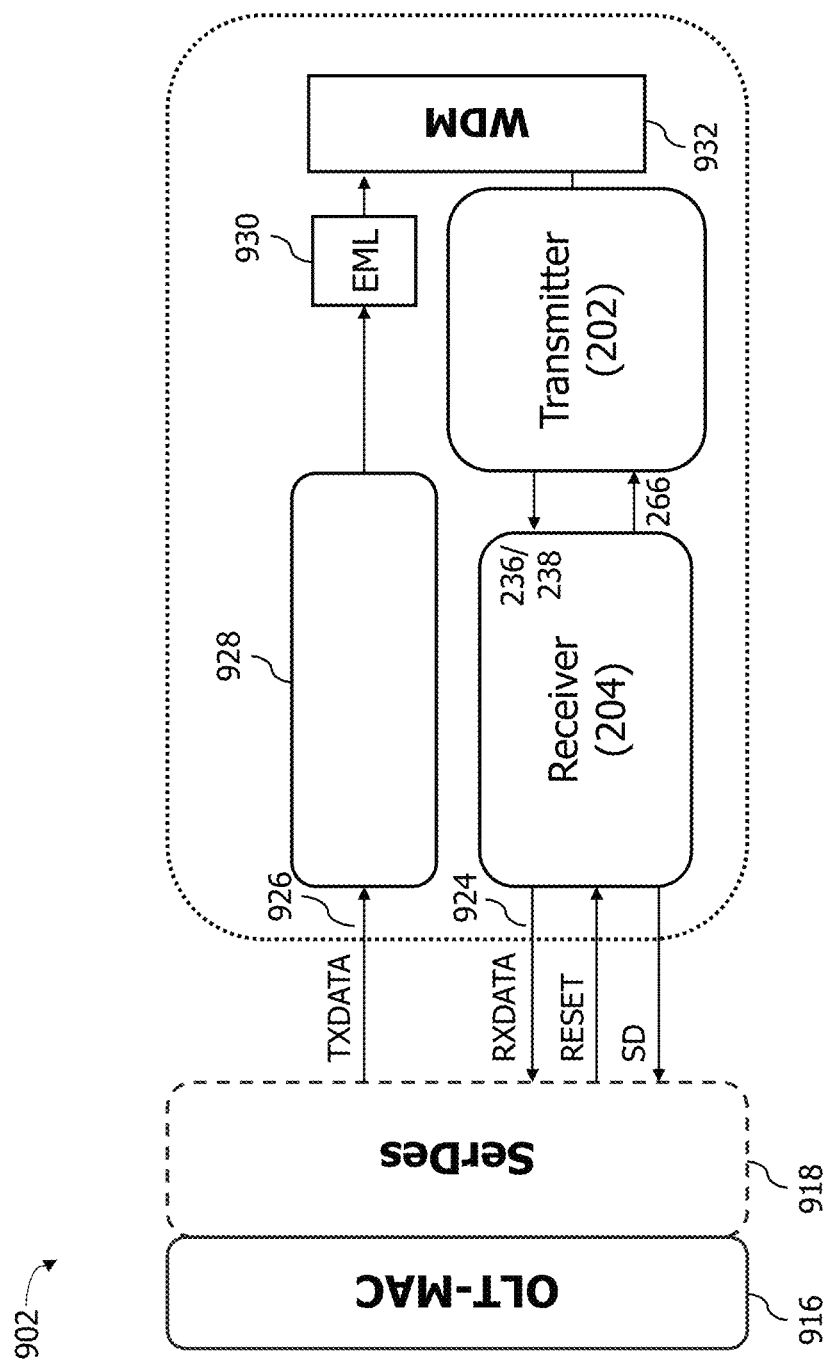
FIG. 9 is a diagram of an example of an optical line terminal (OLT), illustrated in accordance with one example of the subject technology.

FIG. 9 is a diagram of an example optical line terminal (OLT), illustrated in accordance with one example of the subject technology. In this example, an OLT 902 may be an OLT in an XG-PON ecosystem. However, as described above, the subject technology is not limited thereto. The OLT 902 may include an OLT-MAC 916 that controls communication of downstream data and upstream data. The OLT 902 may include a serializer-deserializer (SerDes) 918. The deserializer of the SerDes 918 may receive the data (RXDATA 924) from the receiver 204. The serializer of the SerDes 918 may transmit the data (TXDATA 926) to a transmitter block 928 which is connected to an electro-absorption modulated laser (EML) 930. The EML 930 is a semiconductor device which can be used for modulating the intensity of an optical signal. The EML 930 is connected to a wavelength-division multiplexer (WDM) 932 used for fiber-optic communications. The WDM 932 may multiplex a number of optical carrier signals onto a single optical fiber by using different wavelengths of laser light, and thereby enable bidirectional communications over a single strand of fiber. On the transmitting side, electrical signals may be sent from the SerDes 918 to the transmitter block 928 which converts electrical signals to optical signals. The optical signals may then be sent to the EML 930 and then to the WDM 932 for fiber-optic communications. On the receiving side, optical signals received from the WDM 932 may be sent to the transmitter 202 which is connected to the receiver 204. The transmitter 202, the receiver 204, the input signals 236 and 238, and the communication port 266 coupled to the receiver 204 are described above in reference to FIGS. 2A-2I. The receiving side may convert the optical signals to electrical signals (e.g., using the transmitter 202) and convert a serial data stream into parallel data streams (e.g., using the deserializer of the SerDes 918). It should be noted that in another configuration, some of the components may be combined or divided into separate parts, and/or eliminated.

In one or more examples, the transmitter 202, the receiver 204 and their components (e.g., 208, 210, 212, 214, 216, 218, 220, and 222) may be implemented using circuits such as transistors (e.g., MOSFETs and/or BJTs). They may also include passive components (e.g., resistors and capacitors). The components of the pulse negotiation and communication management controller 222 (e.g., 316, 318 and 328) may be implemented using circuits. In some examples, one or more of these components may include a processor. A processor may be, for example, a microprocessor or a microcontroller. A processor may include one or more processors.

With respect to the waveforms shown in the figures described herein, the horizontal direction may represent time, and the vertical direction may represent an amplitude or a magnitude.

Various example embodiments and aspects of the disclosure are described below for convenience. These are provided as examples, and do not limit the subject technology. Some of the examples described below are illustrated with respect to the figures disclosed herein simply for illustration purposes without limiting the scope of the subject technology.

One or more aspects of the subject technology provide an apparatus comprising a transmitter device (e.g., the transmitter 202) and a receiver device (e.g., the receiver 204). The transmitter device may be configured to: receive a first signal (e.g., 802 or 858) including a first burst of data; convert the first signal to a first set of electrical signals; transmit the first set of electrical signals (e.g., 806 or 862) to the receiver device; receive a burst absent mode signal (e.g., 848 or 883) from the receiver device, after transmitting the first set of electrical signals to the receiver device. The burst absent mode signal is part of burst absent mode signaling (e.g., 242 or M2), and the burst absent mode signaling may cause the transmitter device to continuously be in a ready state; and while in the ready state: receive a second signal (e.g., 804 or 860) including a second burst of data; convert the second signal to a second set of electrical signals (e.g., 808 or 864), including a direct current (DC) offset (e.g., 608); and transmit the second set of electrical signals to the receiver device 204. The receiver device may be configured to: receive the first set of electrical signals from the transmitter device; transmit the burst absent mode signal to the transmitter device, after receiving the first set of electrical signals (e.g., after completing to receive the first set of electrical signals); detect a presence of the second set of electrical signals; and in response to detecting the presence of the second set of electrical signals: remove all or part of the DC offset from the second set of electrical signals to generate an output set of electrical signals (e.g., 856 or 889); and cause transmitting the output set of electrical signals to a downstream device (e.g., the CDR/Demux 904, the interface 905, or the framer 906). In some aspects, the transmitter device may receive an optical signal via a single-ended input. In some aspects, the transmitter device may receive a signal or single ended signal, or an optical signal, rather than just an optical signal. In one or more aspects, the transmitter device may receive a signal, such as an optical signal or a single-ended signal; however, the subject technology is not limited thereto.

The DC offset may be a settled DC offset, and the receiver device (e.g., 204) may be configured to remove all or part of the DC offset (e.g., using the DC offset removal stage 212) from the second set of electrical signals by causing a pulse (e.g., 838 or 891) to discharge one or more AC coupling capacitors (e.g., the capacitors 704 and 706) receiving the second set of electrical signals.

The receiver device (e.g., 204) may comprise one or more switches (e.g., the switches 708 and 710) configured to receive the pulse, short the one or more AC coupling capacitors and remove all or part of the DC offset on an input stage of the one or more AC coupling capacitors.

The receiver device (e.g., 204) may be further configured to: receive a host reset signal (e.g., 868) from a host before detecting the presence of the second set of electrical signals; and generate the burst absent mode signal based on the host reset signal. The transmitter device 202 may be configured not to receive the host reset signal directly from the host.

The receiver device (e.g., 204) may be further configured to generate the burst absent mode signal, during a registration mode of the apparatus, without receiving or using any host reset signal from a host. The receiver device 204 may be configured to generate the burst absent mode signal based on an instruction (e.g., the pulse 830) generated internally by the receiver device 204 (e.g., the pulse generator 326).

During a mission mode of the apparatus, while the presence of the second set of electrical signals is detected, the receiver device (e.g., 204) may be prevented from transmitting to the transmitter device any additional burst absent mode signals (e.g., no reset pulses in the signaling mode M1 after the reset pulse 883) generated based on internally generated instructions (e.g., the pulses 890, 892 and 893). The additional burst absent mode signals may comprise reset pulses. Examples of mission mode are described above in reference to FIGS. 1A and 8B.

The transmitter device (e.g., 202) may be configured to receive the burst absent mode signal before transmitting the second set of electrical signals to allow the transmitter device (e.g., 202) to generate the second set of electrical signals based on the second burst of data using the burst absent mode signal.

The receiver device (e.g., 204) may be configured to transmit another burst absent mode signal (e.g., 850) to the transmitter device (e.g., 202) during a registration mode, in response to detecting the presence of the second set of electrical signals. The another burst absent mode signal may comprise one or more pulses to adjust one or more of the following features of the transmitter device: a gain; a bandwidth control; and one or more signal conditioning features. A registration mode is described above, for example, in reference to FIGS. 1B, 2A-2I, and 8A.

The receiver device (e.g., 204) may be configured to: receive a host reset pulse (e.g., 868) from a host and internally generate a pulse (e.g., 880, 882, 884, 886, or 888); adjust at least one of the host reset instruction and the internally generated instruction to generate an adjusted reset instruction (e.g., 894, 896, 898, 881, or 883); and transmit the adjusted reset instruction as the burst absent mode signal to the transmitter device. The adjusting may resolve a conflict between the host reset instruction and the internally generated instruction. In some aspects, the adjusting may resolve the conflict between the host reset instruction and the internally generated instruction by performing at least one of: (i) delaying, or adjusting a width of, the host reset instruction relative to a proximity of the host reset instruction to the internally generated instruction; or (ii) delaying, or adjusting a width of, the internally generated instruction relative to a proximity of the internally generated instruction to the host reset instruction. In one or more examples, the receiver device may select one of a host reset instruction and an internally generated instruction and process the selected one of the instructions. In some examples, when both the host reset pulse (e.g., 868) and the internally generated instruction (e.g., 888) are present at the same time, the receiver device may select the host reset instruction (e.g., 868) and output a reset instruction (e.g., 883) based on the host reset instruction (e.g., 868). Examples of resolving conflicts are described above in reference to FIGS. 4A, 4B, 4C, 5A and 5B.

The transmitter device may comprise a transimpedance amplifier (TIA) that comprises a signal conditioner (e.g., the signal conditioner 208). The signal conditioner may be configured to generate the first set of electrical signals and the second set of electrical signals as output signals. The signal conditioner may be configured to adjust the TIA's one or more features based on incoming signals only after receiving a reset pulse from the receiver device. The one or more features include one or more of a gain, a bandwidth control, and one or more signal conditioning features. The techniques described herein may be used to communicate with a transmitter device to allow the transmitter device to configure itself to pass a new data burst. Each data burst, be it the first, second, third or any subsequent data burst, may have different signal levels and may require different transmitter device feature settings. The transmitter device may adjust its settings upon receiving a pulse via the communication port 266. The reset pulse may be for being received at a communication port (e.g., 266) coupled to the receiver device.

The receiver device (e.g., 204) may include a DC offset removal stage circuit (e.g., 212 or 302) coupled to (i) an input node which is coupled to the transmitter device and (ii) an input stage circuit which is coupled to a signal conditioner. The receiver device may be configured to (i) receive an input signal from the input node, (ii) remove all or part of the DC offset, and (iii) output a signal without the DC offset to the input stage circuit which is configured to output a signal to the signal conditioner. An example of the DC offset removal stage circuit 212 is described above, for example, in reference to FIGS. 2A, 3, 7A and 7B.

The receiver device (e.g., 204) may include a signal detection circuit (e.g., the signal detect circuit 220) coupled to (i) an input node coupled to the transmitter device (e.g., 202) and (ii) a pulse negotiation and communication management controller (e.g., the controller 222), and configured to (i) receive an input signal from the input node, (ii) detect the presence of the second set of electrical signals based on the input signal, and (iii) output an assertion signal to the pulse negotiation and communication management controller based on the detection. An input node may be a pass-through or unity gain circuit (e.g., a set of emitter follower devices); however, the subject technology is not limited thereto.

The receiver device (e.g., 204) may include a pulse negotiation and communication management controller (e.g., 222) coupled to a host interface (e.g., an interface to receive the host reset signal 230), a signal detection circuit (e.g., the signal detect circuit 220) and a DC offset removal stage circuit (e.g., the DC offset removal stage 212). The pulse negotiation and communication management controller (e.g., 222) may be configured to: when the presence of the second set of electrical signals is detected by the signal detection circuit, receive an assertion signal output by the signal detection circuit; receive a host reset signal via the host interface; when the assertion signal is received, output a DC offset removal stage signal (e.g., capacitor discharge pulse) to the DC offset removal stage circuit to discharge one or more alternating current (AC) coupling capacitors and to remove all or part of the DC offset; and output a reset signal to a communication port coupled to the transmitter device based on the host reset signal or an internally generated instruction. The burst absent mode signal may comprise the reset signal. The pulse negotiation and communication management controller (e.g., 222) may be configured to output the DC offset removal stage signal after the burst absent mode signal is transmitted by the receiver device (e.g., 204) to the transmitter device (e.g., 202).

The pulse negotiation and communication management controller 222 may comprise: a burst event and pulse manager circuit (e.g., the burst event and pulse manager 318) coupled to (i) a host signal decoder circuit (e.g., the host signal decoder 316), (ii) a signal detection circuit (e.g., the on-chip signal detect circuit 220), (iii) a pulse generator circuit (e.g., the programmable frequency pulse generator 326), (iv) a signal conditioner (e.g., the signal conditioner 216) and (v) a limiting amplifier signal recovery stage circuit (e.g., the limiting amplifier signal recovery stage 302), and configured to (i) receive and process the host reset signal from the host signal decoder circuit, the internally generated instruction from the pulse generator circuit, and the assertion signal from the signal detection circuit, and (ii) output a processed signal to the signal conditioner, output the DC offset removal stage signal to the limiting amplifier signal recovery stage circuit based on the assertion signal, and cause outputting the reset signal to the communication port for providing the reset signal to the transmitter device. The processed signal, the DC offset removal stage signal, and the reset signal may be controllable in frequency, timing or length.

The pulse negotiation and communication management controller (e.g., 222) may further comprise: an encoder circuit (e.g., the multi-level encoder 328) coupled to the burst event and pulse manager circuit and configured to (i) receive the reset signal from the burst event and pulse manager circuit, (ii) encode the reset signal, and (ii) output the encoded reset signal to the transmitter device (e.g., 202).

In one or more aspects, an apparatus may comprise a transmitter device (e.g., 202) and a receiver device (e.g., 204). The transmitter device (e.g., 202) may be configured to: receive a first transmitter input signal (e.g., 802 or 858); transmit first transmitter output signals (e.g., 806 or 862) to the receiver device (e.g., 204); receive a reset signal (e.g., 848, 850 or 883) from the receiver device (e.g., 204), after transmitting the first transmitter output signals to the receiver device (e.g., 204); receive a second transmitter input signal (e.g., 804 or 860); generate second transmitter output signals (e.g., 808 or 864) based on the second transmitter input signal and the reset signal from the receiver device (e.g., 204). An offset (e.g., 608) may be present between the second transmitter output signals; and transmit the second transmitter output signals to the receiver device (e.g., 204) after receiving the reset signal. The receiver device (e.g., 204) may be configured to: receive the first transmitter output signals from the transmitter device (e.g., 202) as first receiver input signals (e.g., 236 and 238); generate or forward the reset signal; transmit the reset signal to the transmitter device (e.g., 202), after receiving the first transmitter output signals and before receiving the second transmitter output signals as second receiver input signals e.g., 236 and 238); detect a presence of the second receiver input signals (e.g., by 220); and in response to detecting the presence of the second receiver input signals: remove the offset from the second receiver input signals to generate receiver output signals (e.g., 856 or 889); and cause transmitting the receiver output signals to a subsequent device. The offset is not present in the receiver output signals.

In some aspects, the second receiver input signals may comprise a non-inverted signal (e.g., 604) and an inverted signal (e.g., 606); the offset may be a direct current (DC) offset (e.g., 608) in amplitude or magnitude between the non-inverted signal and the inverted signal; and the receiver device (e.g., 204) may be configured to remove all or part of the DC offset from the second receiver input signals by causing a pulse (e.g., 838 or 891) to discharge one or more alternating current (AC) coupling capacitors (e.g., 704 and 706) receiving the second receiver input signals.

In some aspects, the receiver device (e.g., 204) may be further configured to: receive a host reset pulse (e.g., 868) from a host and internally generate a pulse (e.g., 888); and process at least one of the host reset pulse and the internally generated instruction to generate a reset instruction (e.g., 883). The reset signal may comprise the reset instruction (e.g., 883).

In one or more aspects, a method includes one or more methods, operations or portions thereof described herein. In one or more aspects, an apparatus includes one or more memories and one or more processors, the one or more processors configured to cause performing one or more methods, operations or portions thereof described herein. In one or more aspects, an apparatus includes means adapted for performing one or more methods, operations or portions thereof described herein. In one or more aspects, a hardware apparatus includes circuits configured to perform one or more methods, operations or portions thereof described herein. In one or more aspects, an apparatus includes components operable to carry out one or more methods, operations or portions thereof described herein. In one or more aspects, a non-transitory machine-readable storage medium (e.g., one or more memories and/or one or more registers) store instructions that, when executed by one or more processors, cause one or more processors to perform one or more methods, operations or portions thereof described herein.

Further examples of the subject technology include various subsets of the above examples combined or otherwise re-arranged in various forms.

In some examples, to illustrate the interchangeability of hardware and software, items such as the various illustrative blocks, modules, components, methods, operations, instructions, and algorithms may have been described generally in terms of their functionality. In some examples, whether such functionality is implemented as hardware, software or a combination of hardware and software depends upon the particular application and design constraints imposed on the overall system. Skilled artisans may implement the described functionality in varying ways for each particular application.

Headings and subheadings, if any, are used for convenience only and do not limit the invention. The word "exemplary" is used to mean serving as an example or illustration. Any implementation described herein as an "example" is not necessarily to be construed as preferred or advantageous over other implementations. Relational terms such as first and second and the like may be used simply for ease of understanding without necessarily requiring or implying any actual relationship or order between elements or actions and without necessarily requiring or implying that they have different characteristics unless stated otherwise.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" and "at least one of A, B, or C" may refer to only A, only B, or only C; any combination of A, B, and C; and/or at least one of each of A, B, and C.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

In one aspect, the blocks or components described in this present disclosure (e.g., components in FIGS. 3-8) may be implemented in circuits or integrated circuits. A circuit or an integrated circuit may include one or more transistors.

In one or more aspects, a transistor may include one or more bipolar junction transistors (BJTs), which may refer to any of a variety of multi-terminal transistors operating on the principal of carrying current using both electrons and holes, including, but not limited to, an n-p-n BJT (NPN BJT) and a p-n-p BJT (PNP BJT).

In one or more aspects, transistors may include one or more field effect transistors (FETs), which may refer to any of a variety of multi-terminal transistors operating on the principals of controlling an electric field to control the shape and hence the conductivity of a channel of one type of charge carrier in a semiconductor material, including, but not limited to, a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET). A MOSFET may be an n-type MOSFET (NMOS) or a p-type MOSFET (PMOS). A complementary metal-oxide semiconductor (CMOS) device may include an NMOS and a PMOS.

In one or more aspects, transistors may include one or more BJTs and FETs. In one or more examples, transistors may include one or more BJTs and one or more CMOS devices, which may be referred to as Bi-CMOS devices.

Unless otherwise mentioned, various configurations described in the present disclosure may be implemented on a silicon, silicon-germanium (SiGe), gallium arsenide (GaAs), indium phosphide (InP) or indium gallium phosphide (InGaP) substrate, or any other suitable substrate.

In one aspect, the terms base, emitter, and collector may refer to three terminals of a transistor and may refer to a base, an emitter and a collector of a bipolar junction transistor or may refer to a gate, a source, and a drain of a field effect transistor, respectively, and vice versa. In another aspect, the terms gate, source, and drain may refer to base, emitter, and collector of a transistor, respectively, and vice versa. In some aspects, a source and a drain may be used interchangeably.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In describing a temporal relationship, when the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

In one or more examples, when an element is "connected" or "coupled" to another element, the element can be directly connected or coupled to another element, and can be indirectly connected or coupled to another element with one or more intervening elements disposed or interposed between the elements, unless otherwise specified.

The disclosure is provided to enable any person skilled in the art to practice the various aspects described herein. In some instances, when a detailed description of well-known functions or configurations may unnecessarily obscure aspects of the present disclosure, the detailed description thereof may have been omitted. The disclosure provides various examples of the subject technology, and the subject technology is not limited to these examples. Various modifications to these aspects will be readily apparent to those skilled in the art, and the principles described herein may be applied to other aspects.

Unless stated otherwise, like reference numerals refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

When the term "comprise," "have," "include," "contain," "constitute," or the like is used, one or more other elements may be added unless a term such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. An element proceeded by "a," "an," "the," or "said" does not, without further constraints, preclude the existence of additional elements.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, or the like). Furthermore, while the subject disclosure may provide many example ranges and values, these are non-limiting examples, and other ranges and values are within the scope of the subject technology.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
a transmitter device configured to:
receive a first signal including a first burst of data;
convert the first signal to a first set of electrical signals;
transmit the first set of electrical signals to a receiver device;
receive a burst absent mode signal from the receiver device, after transmitting the first set of electrical signals to the receiver device, wherein the burst absent mode signal is part of burst absent mode signaling, and the burst absent mode signaling causes the transmitter device to continuously be in a ready state; and
while in the ready state:
receive a second signal including a second burst of data;
convert the second signal to a second set of electrical signals, including a direct current (DC) offset; and transmit the second set of electrical signals to the receiver device; and the receiver device configured to:
receive the first set of electrical signals from the transmitter device;
transmit the burst absent mode signal to the transmitter device, after receiving the first set of electrical signals;
detect a presence of the second set of electrical signals; and
in response to detecting the presence of the second set of electrical signals:
remove the DC offset or a portion of the DC offset from the second set of electrical signals to generate an output set of electrical signals; and
cause transmitting the output set of electrical signals to a subsequent device.

2. The apparatus of claim 1, wherein:
the receiver device is configured to remove the DC offset or a portion of the DC offset from the second set of electrical signals by causing an instruction to discharge one or more alternating current (AC) coupling capacitors receiving the second set of electrical signals.

3. The apparatus of claim 2, wherein the receiver device comprises one or more switches configured to receive the instruction, discharge the one or more AC coupling capacitors, and remove the DC offset or a portion of the DC offset on an input stage of the one or more AC coupling capacitors.

4. The apparatus of claim 1,
wherein the receiver device is further configured to:
receive a host reset signal from a host before detecting the presence of the second set of electrical signals; and
generate the burst absent mode signal based on the host reset signal, and
wherein the transmitter device is configured not to receive the host reset signal directly from the host.

5. The apparatus of claim 1,
wherein the receiver device is further configured to generate the burst absent mode signal, during a registration mode of the apparatus, without receiving or using any host reset signal from a host, and
wherein the receiver device is configured to generate the burst absent mode signal based on an instruction generated internally by the receiver device.

6. The apparatus of claim 1, wherein during a mission mode of the apparatus, while the presence of the second set of electrical signals is detected, the receiver device is prevented from transmitting to the transmitter device any additional burst absent mode signals generated based on internally generated instructions, and wherein the additional burst absent mode signals comprise reset pulses.

7. The apparatus of claim 1, wherein the transmitter device is configured to receive the burst absent mode signal before transmitting the second set of electrical signals to allow the transmitter device to generate the second set of electrical signals based on the second burst of data using the burst absent mode signal.

8. The apparatus of claim 1, wherein:
in response to detecting the presence of the second set of electrical signals, the receiver device is configured to transmit another burst absent mode signal to the transmitter device during a registration mode; and
the another burst absent mode signal comprises one or more instructions to adjust one or more of the following features of the transmitter device: a gain; a bandwidth control; and one or more signal conditioning features.

9. The apparatus of claim 1, wherein the receiver device is further configured to:
receive a host reset instruction from a host and internally generate an instruction;
adjust at least one of the host reset instruction and the internally generated instruction to generate an adjusted reset instruction; and
transmit the adjusted reset instruction as the burst absent mode signal to the transmitter device,
wherein the adjusting resolves a conflict between the host reset instruction and the internally generated instruction.

10. The apparatus of claim 9, wherein the adjusting resolves the conflict between the host reset instruction and the internally generated instruction by performing at least one of:
(i) delaying, or adjusting a width of, the host reset instruction relative to a proximity of the host reset instruction to the internally generated instruction; or
(ii) delaying, or adjusting a width of, the internally generated instruction relative to a proximity of the internally generated instruction to the host reset instruction.

11. The apparatus of claim 1, wherein the transmitter device comprises a transimpedance amplifier (TIA) that comprises a signal conditioner, wherein the signal conditioner is configured to generate the first set of electrical signals and the second set of electrical signals as output signals.

12. The apparatus of claim 11, wherein the signal conditioner is configured to adjust the TIA's one or more features based on incoming signals only after receiving a reset instruction from the receiver device, wherein the reset instruction is for being received at a communication port coupled to the receiver device, and wherein the one or more features include one or more of a gain, a bandwidth control, and one or more signal conditioning features.

13. The apparatus of claim 1, wherein the receiver device comprises:
a DC offset removal stage circuit coupled to (i) an input node which is coupled to the transmitter device and (ii) an input stage circuit which is coupled to a signal conditioner, and configured to (i) receive an input signal from the input node, (ii) remove the DC offset or a portion of the DC offset, and (iii) output a signal without the DC offset to the input stage circuit which is configured to output a signal to the signal conditioner.

14. The apparatus of claim 1, wherein the receiver device comprises:
a signal detection circuit coupled to (i) an input node coupled to the transmitter device and (ii) a pulse negotiation and communication management controller, and configured to (i) receive an input signal from the input node, (ii) detect the presence of the second set of electrical signals based on the input signal, and (iii) output an assertion signal to the pulse negotiation and communication management controller based on the detection.

15. The apparatus of claim 1, wherein the receiver device comprises:
a pulse negotiation and communication management controller coupled to a host interface, a signal detection circuit and a DC offset removal stage circuit,
wherein the pulse negotiation and communication management controller is configured to:

when the presence of the second set of electrical signals is detected by the signal detection circuit, receive an assertion signal output by the signal detection circuit;

receive a host reset signal via the host interface;

when the assertion signal is received, output a DC offset removal stage signal to the DC offset removal stage circuit to discharge one or more alternating current (AC) coupling capacitors and to remove the DC offset or a portion of the DC offset; and output a reset signal to a communication port coupled to the transmitter device based on the host reset signal or an internally generated instruction, wherein the burst absent mode signal comprises the reset signal, and wherein the pulse negotiation and communication management controller is configured to output the DC offset removal stage signal after the burst absent mode signal is transmitted by the receiver device to the transmitter device.

16. The apparatus of claim 15, wherein the pulse negotiation and communication management controller comprises:

a burst event and pulse manager circuit coupled to (i) a host signal decoder circuit, (ii) a signal detection circuit, (iii) a pulse generator circuit, (iv) a signal conditioner and (v) a limiting amplifier signal recovery stage circuit, and configured to (i) receive and process the host reset signal from the host signal decoder circuit, the internally generated instruction from the pulse generator circuit, and the assertion signal from the signal detection circuit, and (ii) output a processed signal to the signal conditioner, output the DC offset removal stage signal to the limiting amplifier signal recovery stage circuit based on the assertion signal, and cause outputting the reset signal to the communication port for providing the reset signal to the transmitter device, and wherein the processed signal, the DC offset removal stage signal, and the reset signal are controllable in frequency, timing or length.

17. The apparatus of claim 16, wherein the pulse negotiation and communication management controller further comprises:

an encoder circuit coupled to the burst event and pulse manager circuit and configured to (i) receive the reset signal from the burst event and pulse manager circuit, (ii) encode the reset signal, and (ii) output the encoded reset signal to the transmitter device.

18. An apparatus, comprising:

a transmitter device configured to:

receive a first transmitter input signal;

transmit first transmitter output signals to a receiver device;

receive a reset signal from the receiver device, after transmitting the first transmitter output signals to the receiver device;

receive a second transmitter input signal;

generate second transmitter output signals based on the second transmitter input signal and the reset signal from the receiver device, wherein an offset is present between the second transmitter output signals; and transmit the second transmitter output signals to the receiver device after receiving the reset signal; and the receiver device configured to:

receive the first transmitter output signals from the transmitter device as first receiver input signals;

generate or forward the reset signal;

transmit the reset signal to the transmitter device, after receiving the first transmitter output signals and before receiving the second transmitter output signals as second receiver input signals;

detect a presence of the second receiver input signals; and in response to detecting the presence of the second receiver input signals:

remove the offset or a portion of the offset from the second receiver input signals to generate receiver output signals; and cause transmitting the receiver output signals to a subsequent device, wherein the offset is not present in the receiver output signals.

19. The apparatus of claim 18, wherein:

the second receiver input signals comprise a non-inverted signal and an inverted signal;

the offset is a direct current (DC) offset in amplitude or magnitude between the non-inverted signal and the inverted signal; and the receiver device is configured to remove the DC offset or a portion of the DC offset from the second receiver input signals by causing an instruction to discharge one or more alternating current (AC) coupling capacitors receiving the second receiver input signals.

20. The apparatus of claim 18, wherein the receiver device is further configured to:

receive a host reset instruction from a host and internally generate an instruction; and process at least one of the host reset instruction and the internally generated instruction to generate a reset instruction, wherein the reset signal comprises the reset instruction.

* * * * *